United States Patent
Kawaguchi

(10) Patent No.: US 7,428,404 B2
(45) Date of Patent: Sep. 23, 2008

(54) COMMUNICATION APPARATUS WITH EXTERNAL ACTIVATION OF COMMUNICATIONS LINK

(75) Inventor: Kyoko Kawaguchi, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 605 days.

(21) Appl. No.: 10/911,320

(22) Filed: Aug. 4, 2004

(65) Prior Publication Data

US 2005/0032549 A1    Feb. 10, 2005

(30) Foreign Application Priority Data

Aug. 5, 2003    (JP)    ............................. 2003-286966

(51) Int. Cl.
*H04B 7/15*    (2006.01)

(52) U.S. Cl. ........................ 455/11.1; 455/41.2; 455/68; 455/92; 455/140; 455/151.2; 455/343.2; 455/352; 455/420; 455/574; 370/230; 340/825.72; 379/348; 709/225; 726/4; 726/6

(58) Field of Classification Search .............. 455/7, 455/11.1, 15, 16, 41.2, 68, 70, 88, 90.3, 92, 455/127.1, 128, 140, 343.2, 343.5, 344, 347, 455/352, 418, 419, 420, 428, 500, 561, 556.1, 455/557, 572, 574, 151.2, 414.1, 555, 556.2, 455/558; 370/230, 231; 709/225, 238, 242; 379/185, 323, 348, 395.01, 428.01, 428.02, 379/433.08, 454, 455; 340/10.33, 825.71, 340/825.72, 853.2, 870.02; 726/2, 3, 4, 5, 726/6, 8

See application file for complete search history.

(56) References Cited

U.S. PATENT DOCUMENTS 5,438,329 A *  8/1995 Gastouniotis et al. .. 340/870.02

(Continued)

FOREIGN PATENT DOCUMENTS

EP    1 199 879    4/2002

(Continued)

OTHER PUBLICATIONS

Muller, Thomas, Bluetooth Security Architecture, Jul. 15, 1999, Version 1.0, 1-33.*

*Primary Examiner*—Dwayne D. Bost
*Assistant Examiner*—James D Ewart
(74) *Attorney, Agent, or Firm*—Pearne & Gordon LLP

(57) ABSTRACT

Herein disclosed is a communication apparatus to be operative in combination with first and second external devices for respectively producing first and second information, comprising: first information receiving means for receiving the first information from the first external device; communication performing means for performing a communication with the second external device by receiving the second information from the second external device and producing an exchange information to be transmitted to the second external device and; controlling means for controlling the communication performing means by assuming two different operational states including a first operational state to allow the communication performing means to be operable to perform the communication with the second external device and a second operational state to allow the communication performing means to be inoperable to perform the communication with the second external device, the controlling means being adapted to selectively assume the first and second operational states in response to the first information received by the first information receiving means.

10 Claims, 17 Drawing Sheets

U.S. PATENT DOCUMENTS

| | | | |
|---|---|---|---|
| 5,475,374 A | 12/1995 | Moore | |
| 5,497,339 A * | 3/1996 | Bernard | 708/109 |
| 5,560,021 A * | 9/1996 | Vook et al. | 713/323 |
| 5,907,491 A * | 5/1999 | Canada et al. | 700/108 |
| 6,055,429 A * | 4/2000 | Lynch | 455/445 |
| 6,192,400 B1 * | 2/2001 | Hanson et al. | 709/217 |
| 6,198,913 B1 * | 3/2001 | Sung et al. | 455/343.3 |
| 6,567,855 B1 | 5/2003 | Tubbs et al. | |
| 6,760,578 B2 * | 7/2004 | Rotzoll | 455/343.2 |
| 6,810,428 B1 * | 10/2004 | Larsen et al. | 709/238 |
| 6,832,251 B1 * | 12/2004 | Gelvin et al. | 709/224 |
| 6,879,806 B2 * | 4/2005 | Shorty | 455/11.1 |
| 6,895,215 B2 * | 5/2005 | Uhlmann | 455/3.01 |
| 6,967,589 B1 * | 11/2005 | Peters | 340/854.6 |
| 6,968,153 B1 * | 11/2005 | Heinonen et al. | 455/11.1 |
| 7,092,713 B2 * | 8/2006 | Raji | 455/445 |
| 7,096,491 B2 * | 8/2006 | Cheng | 726/4 |
| 7,123,908 B2 * | 10/2006 | Chandler | 455/428 |
| 7,130,584 B2 * | 10/2006 | Hirvonen | 455/41.2 |
| 7,177,023 B2 * | 10/2006 | Takeda et al. | 455/574 |
| 7,209,771 B2 * | 4/2007 | Twitchell, Jr. | 455/574 |
| 7,254,367 B2 * | 8/2007 | Helden et al. | 455/41.2 |
| 2002/0098861 A1 * | 7/2002 | Doney et al. | 455/527 |
| 2003/0022667 A1 | 1/2003 | Kim | |
| 2003/0036350 A1 * | 2/2003 | Jonsson et al. | 455/41 |
| 2003/0050009 A1 * | 3/2003 | Kurisko et al. | 455/41 |
| 2003/0200465 A1 * | 10/2003 | Bhat et al. | 713/202 |
| 2003/0226036 A1 * | 12/2003 | Bivens et al. | 713/201 |
| 2004/0054916 A1 * | 3/2004 | Foster et al. | 713/200 |
| 2004/0092266 A1 * | 5/2004 | Olrik | 455/445 |
| 2004/0117665 A1 * | 6/2004 | Ong | 713/202 |
| 2004/0192206 A1 * | 9/2004 | Hirvonen | 455/41.2 |
| 2004/0247023 A1 * | 12/2004 | Sasai et al. | 375/220 |
| 2005/0015621 A1 * | 1/2005 | Ashley et al. | 713/201 |
| 2005/0035877 A1 * | 2/2005 | Kim | 340/870.02 |
| 2005/0090279 A9 * | 4/2005 | Witkowski et al. | 455/550.1 |
| 2005/0162283 A1 * | 7/2005 | Salazar Cardozo | 340/870.11 |
| 2005/0232187 A1 * | 10/2005 | Haller et al. | 370/328 |
| 2006/0143466 A1 * | 6/2006 | Muller et al. | 713/182 |

FOREIGN PATENT DOCUMENTS

| | | |
|---|---|---|
| JP | 2000-056003 | 2/2000 |
| JP | 2003-198673 | 7/2003 |
| JP | 2003-324446 | 11/2003 |
| JP | 2004-045251 | 2/2004 |
| WO | 01/74011 | 10/2001 |
| WO | 03/034660 | 4/2003 |

* cited by examiner

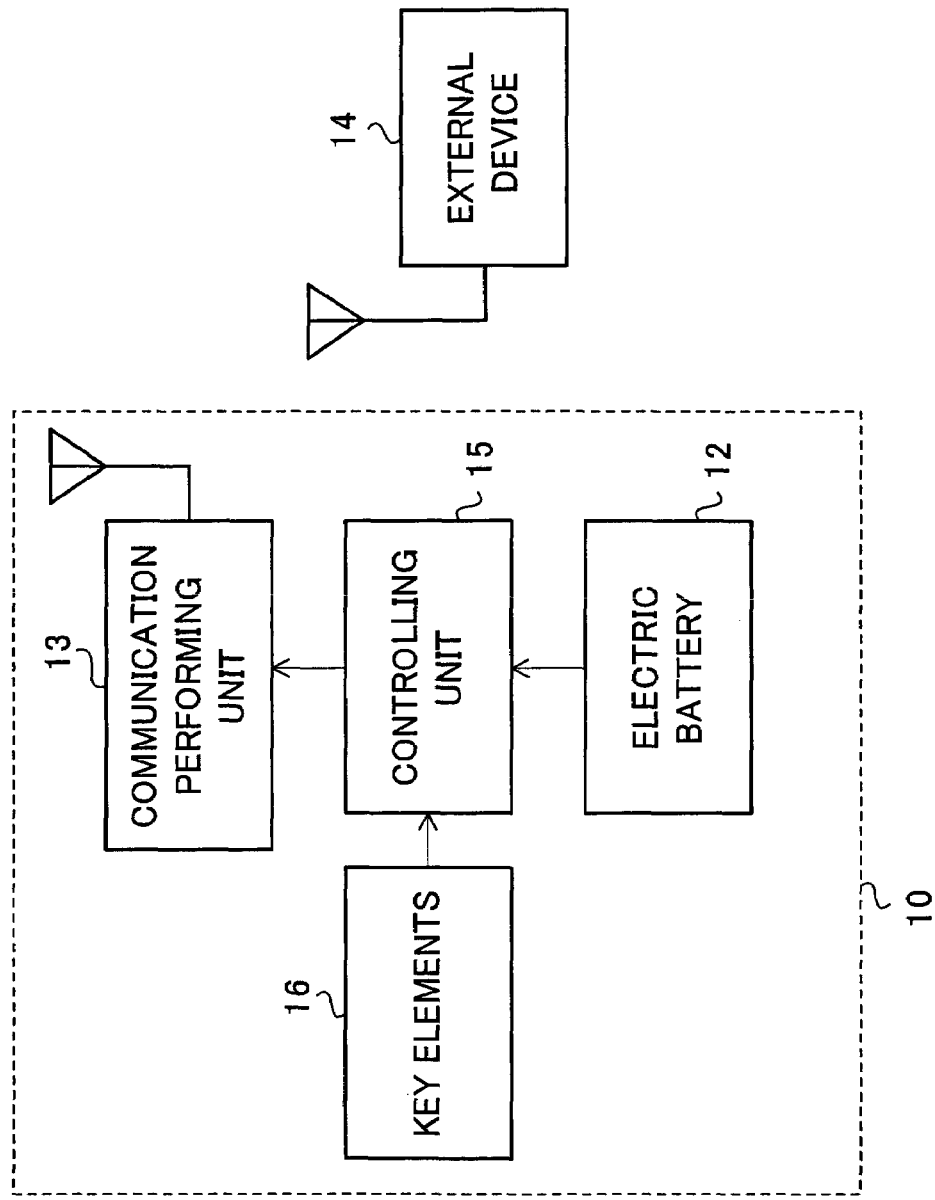

COMMUNICATION APPARATUS WITH EXTERNAL ACTIVATION OF COMMUNICATIONS LINK

BACKGROUND OF THE INVENTION

1. Field of the Invention

The present invention relates to a communication apparatus, and more particularly to a communication apparatus such as for example a mobile phone, a personal data assistance, and an integrated circuit card, which are available for communication with an external device.

2. Description of the Related Art

In recent years, the conventional communication apparatus of this type has been used for communication with an external device such as for example a personal computer, an automotive vehicle, an automatic vending machine, an automatic ticket checker, and an automatic teller machine.

One of the conventional communication apparatuses so far used is disclosed on the internet website <http://www.itmedia.co.jp/mobile/news/0106/04/bt2_m.html> as an article "I tried having a mobile phone perform communication with a computer "VAIO" through a specific microwave based on wireless communication standard "Bluetooth" (1/2)".

The conventional communication apparatus 10 is shown in FIG. 17 as comprising a housing (not shown), an electric battery 12 to be detachably accommodated in the housing to generate an electrical energy, a communication performing unit 13 to be accommodated in the housing to perform a communication with an external device under the condition that the communication performing unit 13 assumes an energized state by receiving the electrical energy from the electric battery 12 for the purpose of the communication with the external device, a controlling unit 15 for controlling the communication performing unit 13 to assume two different operational states including a first operational state to control the communication performing unit 13 to allow the communication performing unit 13 to be operable to perform the communication with the external device 14 by receiving the electrical energy from the electric battery 12, and a second operational state to control the communication performing unit 13 to allow the communication performing unit 13 to be inoperable to perform the communication with the external device 14 by failing to receive the electrical energy from the electric battery 12, and a plurality of key elements 16 to be mounted on the housing to have the controlling unit 15 selectively assume the first and second operational states. The operation of the controlling unit 15 is completed by a plurality of pushing operations of the key elements 16. Those who are unfamiliar with the operation of the conventional communication apparatus like the elderly and children frequently fail to operate by the reason that the plurality of key elements need to be pushed to work the conventional communication apparatus, thereby making it difficult and tedious for the operator like the elderly and children to operate in line with the description made in a manual.

The conventional communication apparatus, however, encounters such a problem that the pushing operations of the key elements tend to make it difficult and tedious for an operator to selectively switch the operational states. The operator, on the other hand, is liable to forget an operation to de-energize the conventional communication apparatus by pushing the key elements. This leads to the conventional communication apparatus kept energized, thereby makes it impossible for the conventional communication apparatus to save the electrical energy to be generated by the electric battery.

SUMMARY OF THE INVENTION

It is, therefore, an object of the present invention to provide a communication apparatus which makes it easy and convenient for an operator to selectively switch the operational states.

It is another object of the present invention to provide a communication apparatus which makes it possible for the communication apparatus to save the electrical energy to be generated by the electric battery.

It is a further object of the present invention to provide a communication apparatus which can automatically and alternatively assume two different operational states including a first operational state to be operable to perform a communication with an external device by detecting a specific area in association with the external device, and a second operational state to be inoperable to perform with the external device by detecting the specific area.

It is a still further object of the present invention to provide a communication apparatus which can automatically and selectively assume a plurality of operational states to be respectively operable to perform communication with external devices by distinguishing the external devices.

It is a yet further object of the present invention to provide a communication apparatus which can save the electrical energy to be generated by the electric battery by detecting the specific area.

According to a first aspect of the present invention, there is provided a communication apparatus to be operative in combination with first and second external devices for respectively producing first and second information, comprising: first information receiving means for receiving the first information from the first external device; communication performing means for performing a communication with the second external device by receiving the second information from the second external device and producing an exchange information to be transmitted to the second external device; and controlling means for controlling the communication performing means by assuming two different operational states including a first operational state to allow the communication performing means to be operable to perform the communication with the second external device, and a second operational state to allow the communication performing means to be inoperable to perform the communication with the second external device, the controlling means being adapted to selectively assume the first and second operational states in response to the first information received from the first external device.

The first information may be represented by a first operational state setting signal to be transmitted to the first information receiving means by the first external device. The controlling means may be adapted to control the communication performing means to allow the communication performing means to be operable to perform the communication with the second external device in response to the first operational state setting signal received by the first information receiving means.

The first information may be represented by a first operational state setting signal to be transmitted to the second information receiving means by the first external device. The controlling means may be adapted to control the communication performing means to allow the communication performing means to be inoperable to perform the communication with the second external device in response to the second operational state setting signal received by the first information receiving means.

The first information may be represented by a radio frequency wave to be transmitted to the first information receiving means by the first external device. The first information receiving means may be adapted to assume an energized state to receive the first information from the first external device in response to the radio frequency wave received from the first external device.

The controlling means may include an elapsed time measuring unit for measuring an elapsed time in response to the first operational state setting signal received by the first information receiving means before judging whether or not the elapsed time exceeds a predetermined period of time. The controlling means may be adapted to assume the second operational state when the judgment is made that the elapsed time exceeds a predetermined period of time.

According to a second aspect of the present invention, there is provided a communication apparatus to be operative in combination with a first external device for producing first information, comprising: a housing; a communication module to be accommodated in the housing, the communication module including communication performing means for performing a communication with the second external device, and controlling means for controlling the communication performing means by assuming two different operational states including a first operational state to allow the communication performing means to be operable to perform the communication with the second external device, and a second operational state to allow the communication performing means to be inoperable to perform the communication with the second external device; and a communication control module to be accommodated in the housing, the communication control module including first information receiving means for receiving the first information from the first external device, and judging means for judging whether or not to allow the communication performing means of the communication module to be operable to perform the communication with the second external device on the basis of the first information received by the first information receiving means, wherein the controlling means of the communication module is adapted to selectively assume the first and second operational states in response to the judgment of the judging means of the communication control module.

The first information may be represented by a first operational state setting signal to be transmitted to the first information receiving means by the first external device. The controlling means of the communication module may be adapted to control the communication performing means of the communication module to allow the communication performing means of the communication module to be operable to perform the communication with the second external device in response to the first operational state setting signal received by the first information receiving means of the communication control module.

The first information may be represented by a second operational state setting signal to be transmitted to the first information receiving means by the first external device. The controlling means of the communication module may be adapted to control the communication performing means of the communication module to allow the communication performing means of the communication module to be inoperable to perform the communication with the second external device in response to the second operational state setting signal received by the first information receiving means of the communication control module.

The first information may be represented by a radio frequency wave to be transmitted to the first information receiving means of the communication control module by the first external device. The first information receiving means of the communication control module may be adapted to assume an energized state to receive the first information from the first external device in response to the radio frequency wave received from the first external device.

The controlling means of the communication module may include an elapsed time measuring unit for measuring an elapsed time in response to the first operational state setting signal received by the first information receiving means of the communication control module before judging whether or not the elapsed time exceeds a predetermined period of time. The controlling means of the communication module is adapted to assume the second operational state when the judgment is made that the elapsed time exceeds a predetermined period of time.

The communication apparatus may further comprise an electric battery accommodated in the housing to produce an electrical energy. The controlling means of the communication module may include a switching unit to be electrically connected to the electric battery, the switching unit being adapted to assume two different operational states including a first operational state to have the communication performing means of the communication module receive the electrical energy produced by the electric battery to ensure that the communication performing means of the communication module is operable to perform the communication with the second external device, and a second operational state to have the communication performing means of the communication module fail to receive the electrical energy produced by the electric battery to ensure that the communication performing means of the communication module is inoperable to perform the communication with the second external device.

According to a third aspect of the present invention, there is provided a communication apparatus to be operative in combination with a first external device for producing first information, comprising: a housing; a communication module to be accommodated in the housing, the communication module including first information receiving means for receiving the first information from the first external device, communication performing means for performing a communication with the second external device, and controlling means for controlling the communication performing means by assuming two different operational states including a first operational state to allow the communication performing means to be operable to perform the communication with the second external device, and a second operational state to allow the communication performing means to be inoperable to perform the communication with the second external device; and a communication control module to be accommodated in the housing, the communication control module including judging means for judging whether or not to allow the communication performing means of the communication module to be operable to perform the communication with the second external device on the basis of the first information received by the first information receiving means of the communication module, wherein the controlling means of the communication module is adapted to selectively assume the first and second operational states in response to the judgment of the judging means of the communication control module.

The first information may be represented by a first operational state setting signal to be transmitted to the first information receiving means by the first external device. The controlling means of the communication module may be adapted to control the communication performing means of the communication module to allow the communication performing means of the communication module to be operable to perform the communication with the second external device in response to the first operational state setting signal received by the first information receiving means of the communication module.

The first information may be represented by a second operational state setting signal to be transmitted to the first information receiving means by the first external device. The controlling means of the communication module may be adapted to control the communication performing means of the communication module to allow the communication performing means of the communication module to be inoperable to perform the communication with the second external device in response to the second operational state setting signal received by the first information receiving means of the communication module.

The first information may be represented by a radio frequency wave to be transmitted to the first information receiving means of the communication module by the first external device. The first information receiving means of the communication module may be adapted to assume an energized state to receive the first information from the first external device in response to the radio frequency wave received from the first external device.

The communication apparatus may further comprise an electric battery accommodated in the housing to produce an electrical energy. The controlling means of the communication module may include a switching unit having inputted therein the electrical energy produced by the electric battery, the switching unit being adapted to assume two different operational states including a first operational state to have the communication performing means of the communication module receive the electrical energy produced by the electric battery to ensure that the communication performing means of the communication module is operable to perform the communication with the second external device, and a second operational state to have the communication performing means of the communication module fail to receive the electrical energy produced by the electric battery to ensure that the communication performing means of the communication module is inoperable to perform the communication with the second external device.

According to a fourth aspect of the present invention, there is provided a communication module to be operative in combination with a communication control module including first information receiving means for receiving first information from a first external device, judging means for judging whether or not to allow a communication performing means of a communication module to be operable to perform the communication with the second external device on the basis of the first information received by the first information receiving means when the first information receiving means receives the first information from the first external device, comprising: communication performing means for performing a communication with the second external device; and controlling means for controlling the communication performing means by assuming two different operational states including a first operational state to allow the communication performing means to be operable to perform the communication with the second external device, and a second operational state to allow the communication performing means to be inoperable to perform the communication with the second external device, wherein the controlling means of the communication module is adapted to assume the first operational state to allow the communication performing means to be operable to perform the communication with the second external device in response to the judgment of the judging means of the communication control module.

The first information may be represented by a first operational state setting signal to be transmitted to the first information receiving means by the first external device. The controlling means may be adapted to control the communication performing means to allow the communication performing means to be operable to perform the communication with the second external device in response to the first operational state setting signal received by the first information receiving means.

The first information may be represented by a second operational state setting signal to be transmitted to the first information receiving means by the first external device. The controlling means may be adapted to control the communication performing means to allow the communication performing means to be inoperable to perform the communication with the second external device in response to the second operational state setting signal received by the first information receiving means.

The controlling means may include an elapsed time measuring unit for measuring an elapsed time in response to the first operational state setting signal received by the first information receiving means before judging whether or not the elapsed time exceeds a predetermined period of time. The controlling means may be adapted to assume the second operational state when the judgment is made that the elapsed time exceeds a predetermined period of time.

According to a fifth aspect of the present invention, there is provided a communication control module to be operative in combination with a communication module including communication performing means for performing a communication with the second external device, and controlling means for controlling the communication performing means by assuming two different operational states including a first operational state to allow the communication performing means to be operable to perform the communication with the second external device, and a second operational state to allow the communication performing means to be inoperable to perform the communication with the second external device, comprising: first information receiving means for receiving the first information from the first external device; and judging means for judging whether or not to allow the communication performing means of the communication module to be operable to perform the communication with the second external device on the basis of first information received by the first information receiving means when the first information receiving means receives the first information from the first external device, wherein the controlling means of the communication module is adapted to assume the first operational state to allow the communication performing means to be operable to perform the communication with the second external device in response to the judgment of the judging means of the communication control module.

The first information may be represented by a radio frequency wave to be transmitted to the first information receiving means by the first external device. The first information receiving means may be adapted to assume an energized state to receive the first information from the first external device in response to the radio frequency wave received from the first external device.

According to a sixth aspect of the present invention, there is provided a communication control module to be operative in combination with a communication module including first information receiving means for receiving first information from a first external device, communication performing means for performing a communication with the second external device, and controlling means for controlling the communication performing means by assuming two different operational states including a first operational state to allow the communication performing means to be operable to perform the communication with the second external device, and a second operational state to allow the communication performing means to be inoperable to perform the communication with the second external device, comprising: judging means for judging whether or not to allow the communication performing means of the communication module to be operable to perform the communication with the second external device on the basis of the first information received by the first information receiving means of the communication module, wherein the controlling means of the communication module is adapted to selectively assume the first and second operational states in response to the judgment of the judging means of the communication control module.

According to a seventh aspect of the present invention, there is provided a communication module, comprising: first information receiving means for receiving first information from a first external device, communication performing means for performing a communication with the second external device, and controlling means for controlling the communication performing means by assuming two different operational states including a first operational state to allow the communication performing means to be operable to perform the communication with the second external device, and a second operational state to allow the communication performing means to be inoperable to perform the communication with the second external device, wherein the controlling means of the communication module is adapted to selectively assume the first and second operational states in response to the judgment of the judging means of the communication control module.

The first information may be represented by a first operational state setting signal to be transmitted to the first information receiving means by the first external device. The controlling means of the communication module may be adapted to control the communication performing means of the communication module to allow the communication performing means of the communication module to be operable to perform the communication with the second external device in response to the first operational state setting signal received by the first information receiving means of the communication module.

The first information may be represented by a second operational state setting signal to be transmitted to the first information receiving means by the first external device. The controlling means of the communication module may be adapted to control the communication performing means of the communication module to allow the communication performing means of the communication module to be inoperable to perform the communication with the second external device in response to the second operational state setting signal received by the first information receiving means of the communication module.

The controlling means of the communication module may include an elapsed time measuring unit for measuring an elapsed time in response to the first operational state setting signal received by the first information receiving means of the communication module before judging whether or not the elapsed time exceeds a predetermined period of time. The controlling means of the communication module may be adapted to assume the second operational state when the judgment is made that the elapsed time exceeds a predetermined period of time.

According to an eighth aspect of the present invention, there is provided a recordable media having stored thereon a communication control program capable of being executed by a computer, comprising: a judging step of judging whether or not to allow communication performing means to be operable to perform communication with the second external device when the first information is received from the first external device by first information receiving means, and a controlling step of controlling communication performing means by selectively assuming two different operational states including a first operational state to allow the communication performing means to be operable to perform the communication with the second external device, and a second operational state to allow the communication performing means to be inoperable to perform the communication with the second external device in response to the judgment of the judging step.

BRIEF DESCRIPTION OF THE DRAWINGS

The features and advantages of a communication apparatus according to the present invention will be more clearly understood from the following description taken in conjunction with the accompanying drawings in which:

FIG. 17 is a block diagram of the conventional communication apparatus.

DESCRIPTION OF THE PREFERRED EMBODIMENTS

First Preferred Embodiment

Figure 1:
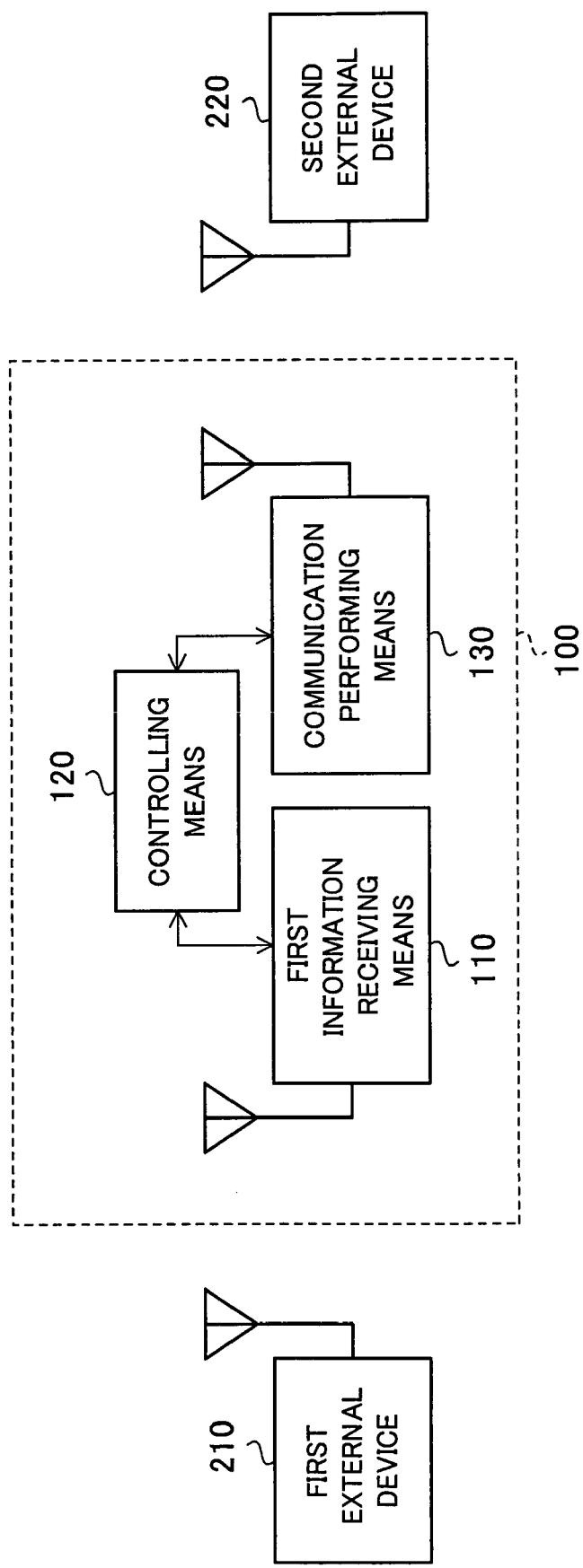
FIG. 1 is a block diagram of the communication apparatus according to the first preferred embodiment of the present invention.
Figure 2:
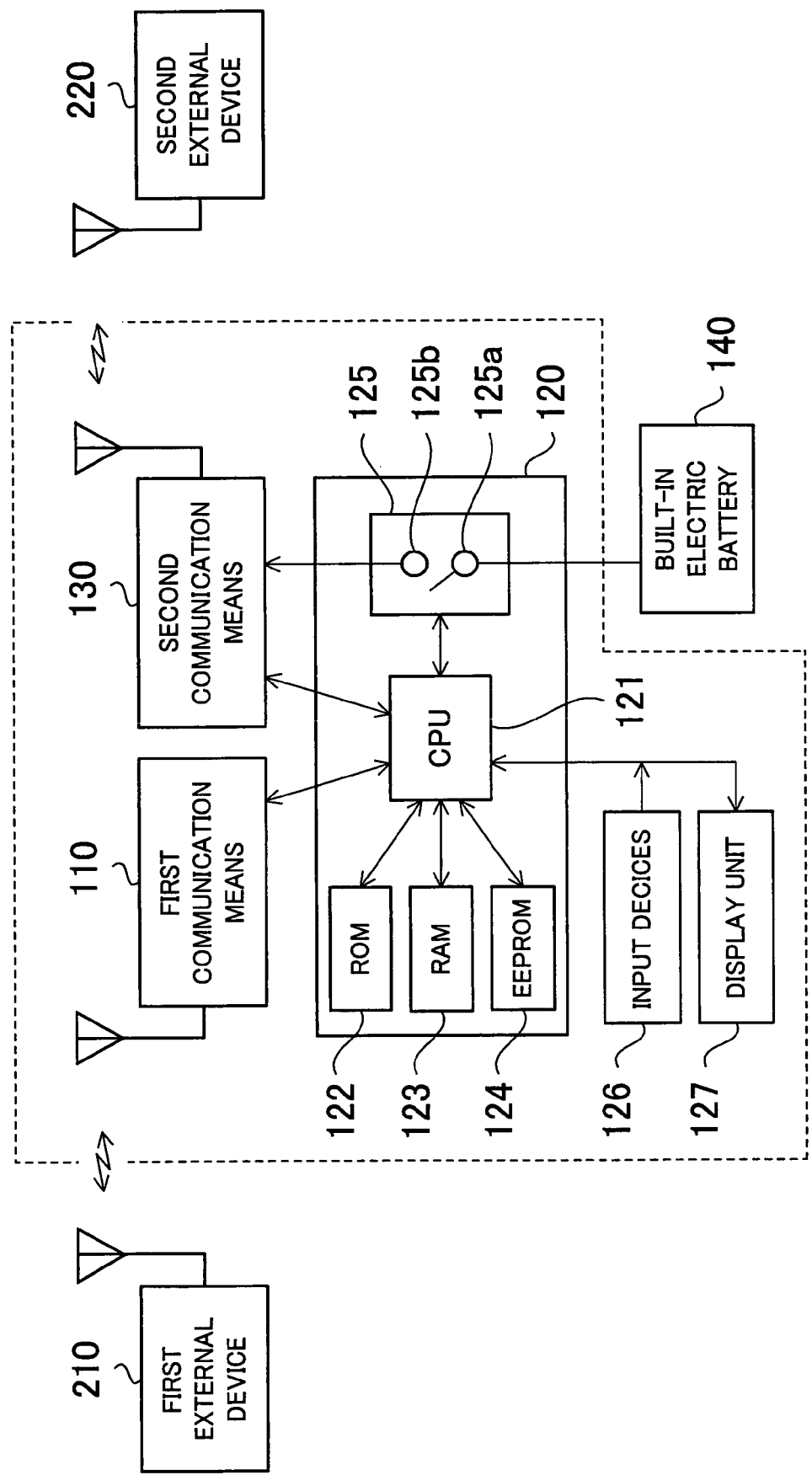
FIG. 2 is a block diagram of the communication apparatus according to the first preferred embodiment of the present invention.
Figure 5:
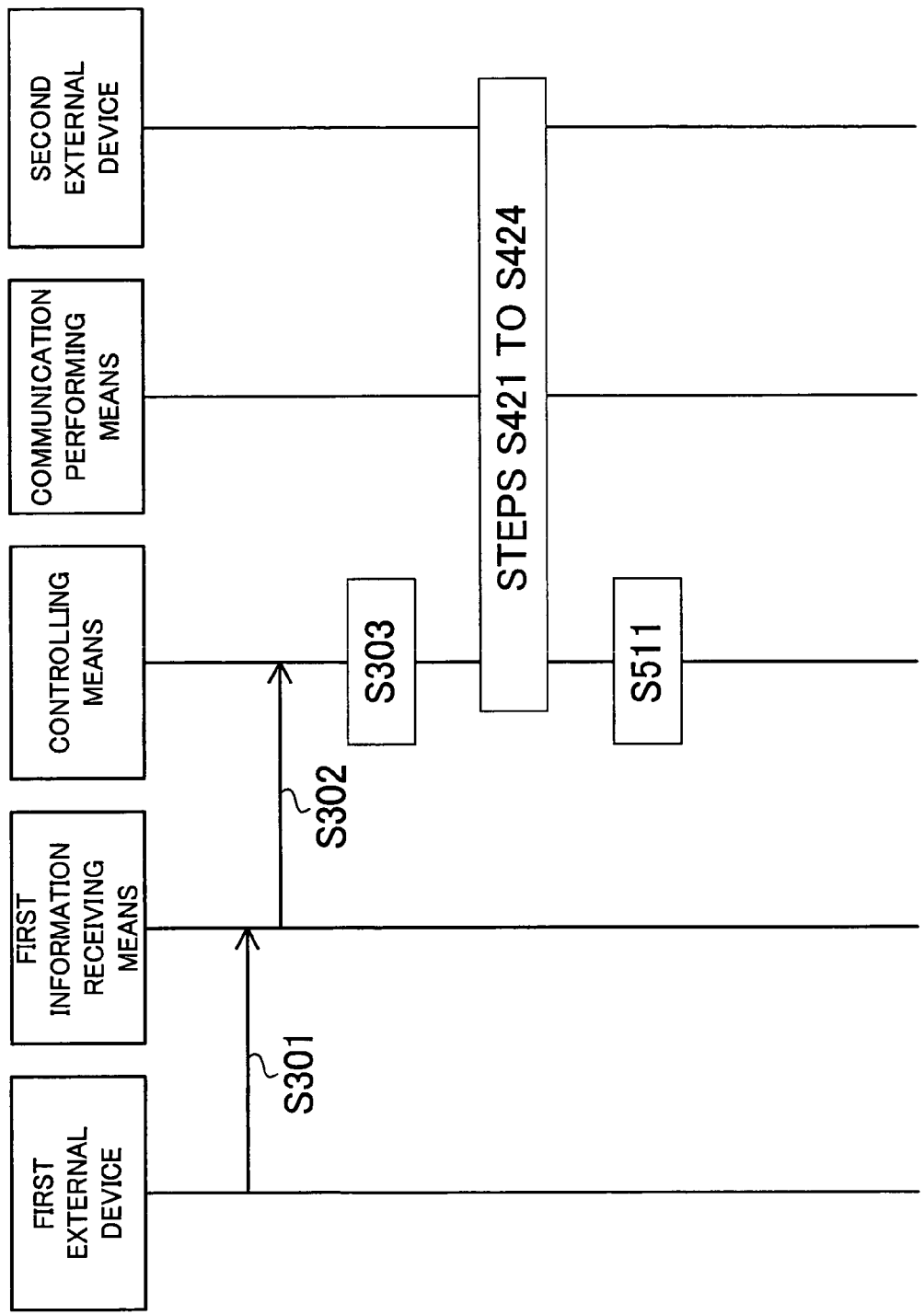
FIG. 5 is a sequence diagram showing a process of the communication apparatus according to the first preferred embodiment of the present invention.

Referring now to FIGS. 1, 2, and 5 of the drawings, there is shown a first preferred embodiment of the communication apparatus according to the present invention.

As shown in FIGS. 1 and 2, the communication apparatus 100 is operative in combination with first and second external devices 210 and 220 for respectively producing first and second information.

The communication apparatus 100 further comprises first information receiving means 110 for receiving the first information from the first external device 210 by performing a passive communication with the first external device 210, communication performing means 130 for performing an active communication with the second external device 220 by receiving the second information from the second external device 220 and producing an exchange information to be transmitted to the second external device 220, and controlling means 120 for controlling the communication performing means 130 to assume two different operational states including a first operational state to allow the communication performing means 130 to be operable to perform the active communication with the second external device 220, and a second operational state to allow the communication performing means 130 to be inoperable to perform the active communication with the second external device 220. The controlling means 130 is adapted to assume the first and second operational states in response to the first information received by the first information receiving means 110.

The term "active communication" is intended to indicate a communication to be conducted between the communication apparatus such as for example a mobile phone and an external device under the condition that the communication apparatus assumes an energized state by receiving an electrical energy from its built-in electric battery for the purpose of the communication with the external device, while the term "passive communication" intended to indicate a communication to be conducted between the communication apparatus such as for example an integrated circuit card (hereinafter simply referred to as "IC card") and an external device under the condition that the communication apparatus assumes an energized state by receiving an electrical energy from the external device for the purpose of the communication with the external device.

Here, the first external device 210 may be adapted to produce and transmit a radio frequency wave indicative of the first information to the communication apparatus 100, while the first information receiving means 110 may be adapted to receive the first information from the first external device 210 by receiving the radio frequency wave from the first external device. The first information receiving means 110 may be adapted to receive the first information from the first external device 210 by performing an optical communication such as for example an infrared data communication with the first external device.

The communication apparatus 100 partially constitutes a mobile phone (not shown), while the mobile phone comprises a housing (not shown), an electric battery (not shown) to be accommodated in the housing, and the communication apparatus 100 to be detachably accommodated in the housing.

As shown in FIG. 2, the controlling means 120 includes a switching unit 125 having two different terminals including a first terminal 125a to receive the electrical energy from the electric battery, and a second terminal 125b to be operable to receive the electrical energy from the electric battery through the first terminal 125a. The switching unit 125 is adapted to assume two different operational states including a first operational state to have the second terminal 125b receive the electrical energy from the electric battery through the first terminal 125a to ensure that the communication performing means 130 is operable to perform the active communication with second external device 220 by receiving the electrical energy from the electric battery, and a second operational state to have the second terminal 125b fail to receive the electrical energy from the electric battery through the first terminal 125a to ensure that the communication performing means 130 is inoperable to perform the active communication with second external device 220 by failing to receive the electrical energy from the electric battery.

The controlling means 120 further includes a central processing unit 121, hereinafter simply referred to as "CPU", adapted to process the first information received from the first information receiving means 110 by executing a specific program such as for example an operating software and an application software, a read only memory 122, hereinafter simply referred to as "ROM", adapted to have stored therein, for example, the operating software to be executed by the CPU 121, a random access memory 123, hereinafter simply referred to as "RAM", adapted to have stored therein the first information received by the first information receiving means 110, and a nonvolatile and rewritable storage media such as for example an electrically erasable programmable read only memory 124, hereinafter simply referred to as "EEPROM", adapted to have stored therein the application software to be executed by the CPU 121.

The first information receiving means 110 includes an antenna and a radio frequency wave receiver 111 for receiving the radio frequency wave from the first external device 210 through the antenna before retrieving the first information from the radio frequency wave by demodulating the radio frequency wave, while the CPU 121 of the controlling means 120 is adapted to receive the first information from radio frequency wave receiver 111 of the first information receiving means 110.

Here, the controlling means 120 may include an inputting device 101 having a plurality of key elements to be mounted on the housing to have the controlling unit selectively assume the first and second operational states. The controlling means 120 may include a display unit 102 having a screen to display on the screen specific information such as for example the first information processed by the CPU 121 of the controlling means 120, the information received from the inputting device 101, the first information stored in the EEPROM, and the information received from the second external device 220 when the active communication is conducted between the communication performing means 130 and the second external device 220.

The first information includes a first operational state setting signal and a second operational state setting signal. The CPU 121 of the controlling means 120 is adapted to control the switching unit 125 of the controlling means 120 to have the switching unit 125 assume the first operational state in response to the first operational state setting signal received from the first information receiving means 110. On the other hand, the CPU 121 of the controlling means 120 is adapted to control the switching unit 125 of the controlling means 120 to have the switching unit 125 assume the second operational state in response to the second operational state setting signal received from the first information receiving means 110.

The CPU 121 of the controlling means 120 is adapted to control the switching unit 125 of the controlling means 120 to have the switching unit 125 of the controlling means 120 assume the first operational state to have the second terminal 125b of the switching unit 125 receive the electrical energy from the electric battery through the first terminal 125a of the switching unit 125 in response to the first operational state setting signal received from the first external device 210, while the communication performing means 130 is operable to perform the active communication with the second external device 220 by receiving the electrical energy from the electric battery. On the other hand, the CPU 121 of the controlling means 120 is adapted to control the switching unit 125 of the controlling means 120 to have the switching unit 125 assume the second operational state to have the second terminal 125b of the switching unit 125 fail to receive the electrical energy from the electric battery through the first terminal 125a of the switching unit 125 in response to the second operational state setting signal received from the first external device 210, while the communication performing means 130 is inoperable to perform the active communication with the second external device 220 by failing to receive the electrical energy from the electric battery.

The CPU 121 of the controlling means 120 is adapted to start to measure the elapsed time in response to the first information received from the first information receiving means 110, and to judge whether or not the measured elapsed time exceeds a predetermined period of time. The CPU 121 of the controlling means 120 is adapted to control the switching unit 125 of the controlling means 120 to have the switching unit 125 assume the second operational state to have the second terminal 125b of the switching unit 125 fail to receive the electrical energy from the electric battery through the first terminal 125a of the switching unit 125 when the judgment is made that the measured elapsed time exceeds the predetermined period of time.

Here, the CPU 121 of the controlling means 120 may be adapted to produce and output an instruction signal as to the session between the communication performing means 130 and the second external device 220 to the communication performing means 130 after controlling the switching unit 125 of the controlling means 120 to have the switching unit 125 assume the first operational state, while the communication performing means 130 may be adapted to establish the session between the communication performing means 130 and the second external device 220 in response to the instruction signal as to the session between the communication performing means 130 and the second external device 220 produced by the CPU 121 of the controlling means 120. The communication performing means 130 may be adapted to produce and output a reply signal as to the session-establishment to the CPU 121 of the controlling means 120 after establishing the session between the communication performing means 130 and the second external device 220. The CPU 121 of the controlling means 120 may be adapted to produce an instruction signal as to the two-way authentication between the communication performing means 130 and the second external device 220 in response to the reply signal as to the session-establishment received from the communication performing means 130, while the communication performing means 130 may be adapted to perform the two-way authentication between the communication performing means 130 and the second external device 220 to judge whether or not to recognize the second external device 220 as a registered device in response to the instruction signal as to the two-way authentication between the communication performing means 130 and the second external device 220 produced by the CPU 121 of the controlling means 120. The communication performing means 130 may be adapted to perform the password authentication by using the public key. The controlling means 120 may be adapted to assume the first operational state to allow the communication performing means 130 to be operable to perform the active communication with the second external device 220 after the judgment is made that the second external device 220 is recognized as the registered device.

The CPU 121 of the controlling means 120 is adapted to start to measure an elapsed time after receiving the first information received from the first information receiving means 110, and to judge whether or not the elapsed time exceeds the period of time. The controlling means 120 is adapted to assume the second operational state to allow the communication performing means 130 to be inoperable to perform the active communication with the second external device 220 by having the communication performing means 130 fail to receive the electrical energy from the electric battery when the judgment is made that the elapsed time exceeds the period of time.

Here, the CPU 121 of the controlling means 120 may be adapted to start to measure an elapsed time after receiving the reply signal as to the session between the communication performing means 130 and the second external device 220 from the second external device 220 through the communication performing means 130. The CPU 121 of the controlling means 120 may be adapted to start to measure the elapsed time after receiving the reply signal as to the authentication between the communication performing means 130 and the second external device 220 from the second external device 220 through the communication performing means 130.

The operation of the communication apparatus 100 according to the first embodiment of the present invention will now be described hereinafter with reference to FIGS. 3 to 5.

Figure 3:
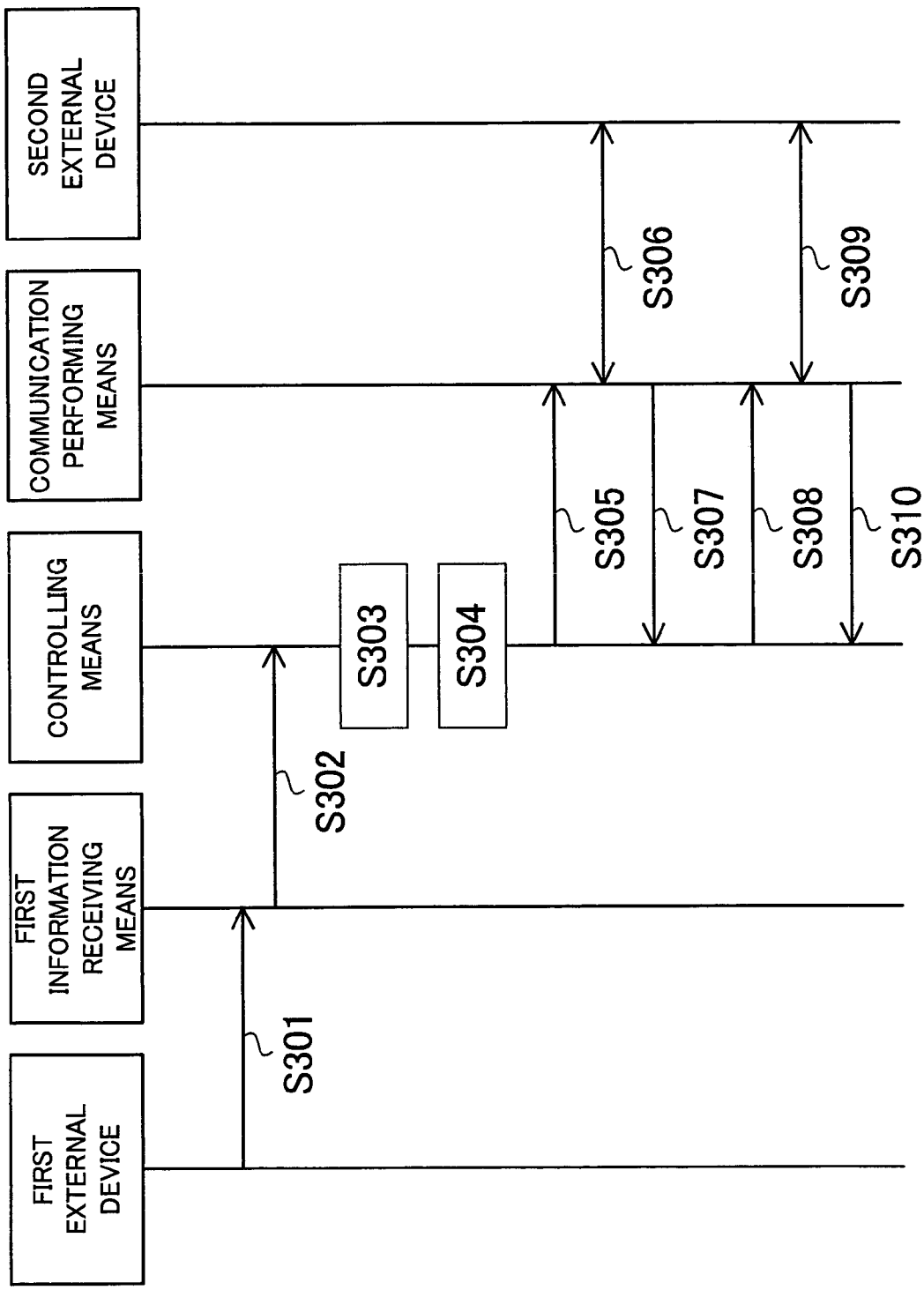
FIG. 3 is a sequence diagram showing a process of the communication apparatus according to the first preferred embodiment of the present invention.

As shown in FIG. 3, the first information is firstly produced and transmitted to the first information receiving means 110 by the first external device 210. The first information is then received by the first information receiving means 110 under the condition that the passive communication is conducted between the first information receiving means 110 and the first external device 210 in the step S301. The first information is then outputted to the controlling means 120 by the first information receiving means 110 in the step S302. The judgment is then made whether or not to allow the communication performing means 130 to be operable to perform the active communication with the second external device 220 on the basis of the first information received from the first information receiving means 110 in the step S303.

When the answer in the step S303 is in the affirmative "YES", the step S303 proceeds to the step S304.

The CPU 121 of the controlling means 120 is operated to control the switching unit 125 of the controlling means 120 to have the switching unit 125 of the controlling means 120 assume the first operational state to allow the communication performing means 130 to receive the electrical energy from the electric battery in response to the first information received from the first information receiving means 110 in the step S304.

The instruction signal as to the session to be established between the communication performing means 130 and the second external device 220 is then produced and outputted to the communication performing means 130 by the controlling means 120 in the step S305. The session is then established between the communication performing means 130 and the second external device 220 in response to the instruction signal as to the session produced by the controlling means 120 in the step S306. The reply signal as to the session-establishment is then produced and outputted to the controlling means 120 by the communication performing means 130 after the session is established between the communication performing means 130 and the second external device 220 in the step S307.

The instruction signal as to the two-way authentication to be performed between the communication performing means 130 and the second external device 220 is produced and outputted to the communication performing means 130 by the controlling means 120 in response to the reply signal as to the session-establishment received from the communication performing means 130 in the step S308.

The two-way authentication is then performed between the communication performing means 130 and the second external device 220 in response to the instruction signal as to the two-way authentication produced by the controlling means 130. The judgment is then made by the communication performing means 130 whether or not to recognized the second external device 220 as a registered device in the step S309.

Here, the two-way authentication may be performed between the communication performing means 130 and the second external device 220 on the basis of the method of one time password authentication.

When the answer in the step S309 is in the affirmative "YES", i.e., the second external device 220 is recognized as the registered device, the controlling means 620 is operated to control the communication performing means 130 to ensure that the communication performing means 130 is operable to perform the active communication with the second external device 220 in the step S310. When, on the other hand, the answer in the step S309 is in the negative "NO", i.e., the second external device 220 is not recognized as the registered device, the controlling means 620 is operated to control the communication performing means 130 to ensure that the communication performing means 130 is inoperable to perform the active communication with the second external device 220.

The communication control method comprises a preparing step of communication apparatus 100, comprising: first information receiving means 110 for receiving the first information from the first external device 210; communication performing means 130 for performing a communication with the second external device 220; and controlling means 120 for controlling the communication performing means 130 by assuming two different operational states including a first operational state to allow the communication performing means 130 to be operable to perform the communication with the second external device 220, and a second operational state to allow the communication performing means 130 to be inoperable to perform the communication with the second external device 220, the controlling means 120 being adapted to selectively assume the first and second operational states in response to the first information received by the first information receiving means 110, a first information receiving step of receiving first information from a first external device 210, a communication performing step of performing a communication with the second external device 220, and a judging step of judging whether or not to allow communication performing means 130 to be operable to perform communication with a second external device 220 when the first information is received from the first external device 210 in the first information receiving step, and a controlling step of controlling communication performing means 130 by selectively assuming two different operational states including a first operational state to allow the communication performing means 130 to be operable to perform the communication with the second external device 220, and a second operational state to allow the communication performing means 130 to be inoperable to perform the communication with the second external device 220 in response to the judgment of the judging step.

The EEPROM 124 of the controlling means 120 constitutes a recordable media having stored thereon a communication control program capable of being executed by the CPU 121 of the controlling means 120, while the communication control program comprises a judging step of judging whether or not to allow communication performing means 130 to be operable to perform communication with the second external device 220 when the first information is received from the first external device 210 by first information receiving means 110, and a controlling step of controlling communication performing means 130 by selectively assuming two different operational states including a first operational state to allow the communication performing means 130 to be operable to perform the communication with the second external device 220, and a second operational state to allow the communication performing means 130 to be inoperable to perform the communication with the second external device 220 in response to the judgment of the judging step.

The following description will be directed to the case that the active communication is terminated between the communication performing means 130 and the second external device 220.

Figure 4:
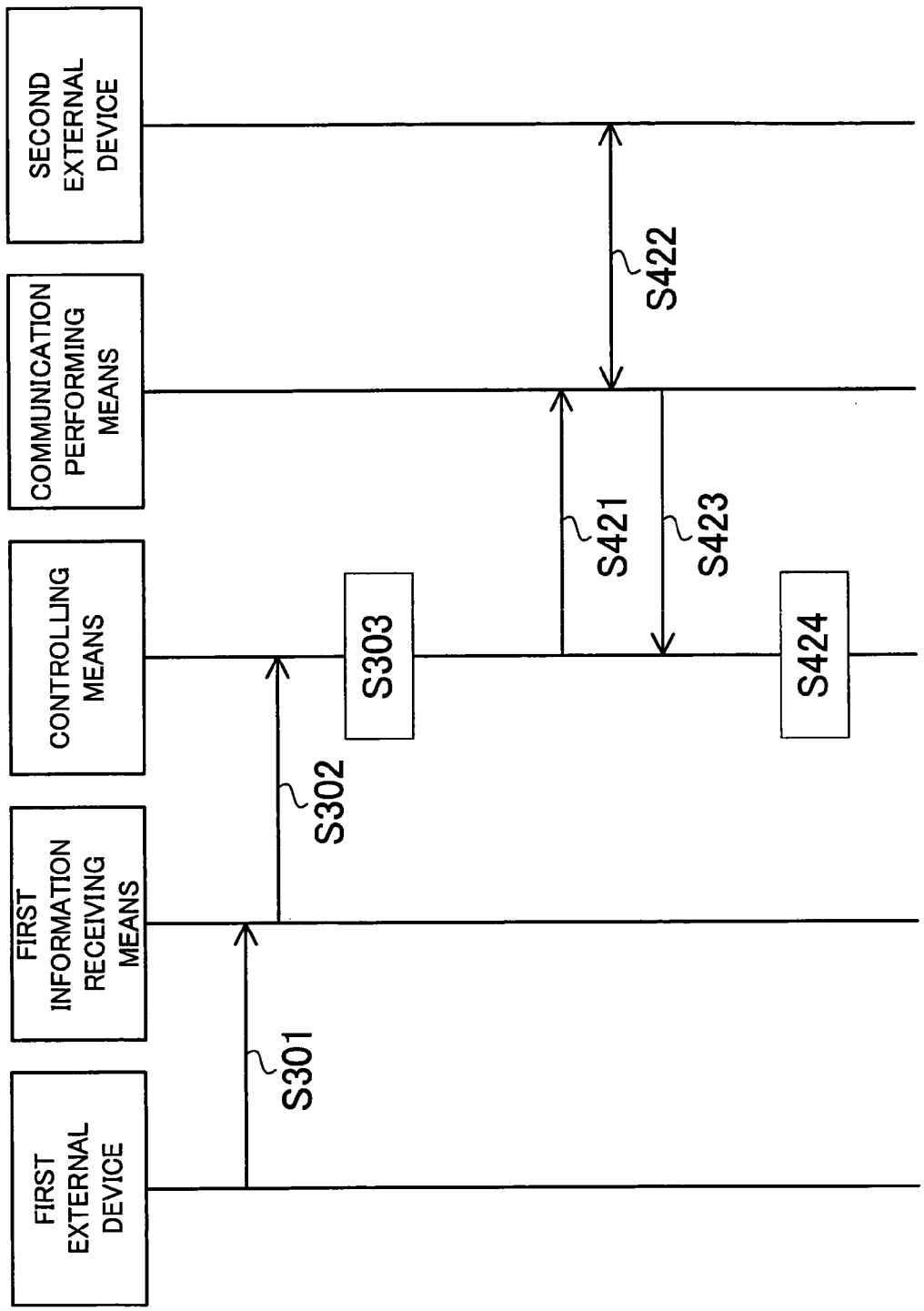
FIG. 4 is a sequence diagram showing a process of the communication apparatus according to the first preferred embodiment of the present invention.

As shown in FIG. 4, the second operational state setting signal is firstly produced and transmitted to the first information receiving means 110 by the first external device 210. The second operational state setting signal is then received by the first information receiving means 110. The instruction signal as to the session-end is then produced and outputted to the communication performing means 130 by the controlling means 120 in response to the second operational state setting signal received by the first information receiving means 110 in the step S421.

The session is terminated between the communication performing means 130 and the second external device 220 in response to the instruction signal as to the session-end received by the communication performing means 130 in the step S422.

When the session is terminated between the communication performing means 130 and the second external device 220, the reply signal as to the session-end is produced and outputted to the controlling means 120 by the communication performing means 130 in the step S423.

The CPU 121 of the controlling means 120 is operated to control the switching unit 125 of the controlling means 120 to have the switching unit 125 of the controlling means 120 assume the second operational state to allow the communication performing means 130 to fail to receive the electrical energy from the electric battery in response to the reply signal as to the session-end received from the communication performing means 130 in the step S424.

The following description will be directed to the case that the elapsed time is measured by the CPU 121 of the controlling means 120 in response to the first information received from the first information receiving means 110.

As shown in FIG. 5, the CPU 121 of the controlling means 120 is firstly operated to start to measure the elapsed time when the answer in the step S309 is in the affirmative "YES"

in the step S511. The judgment is then made whether or not the elapsed time exceeds the predetermined period of time in the step S512.

When the answer in the step S512 is in the affirmative "YES", i.e., the elapsed time exceeds the predetermined period of time, the instruction signal as to the session-end is then produced and outputted to the communication performing means 130 by the controlling means 120 in response to the judgment of the CPU 121 of the controlling means 120 in the step S421. The session is then terminated between the communication performing means 130 and the second external device 220 in response to the instruction signal as to the session-end received by the communication performing means 130 in the step S422.

When the session is terminated between the communication performing means 130 and the second external device 220, the reply signal as to the session-end is produced and outputted to the controlling means 120 by the communication performing means 130 in the step S423.

The CPU 121 of the controlling means 120 is operated to control the switching unit 125 of the controlling means 120 to have the switching unit 125 of the controlling means 120 assume the second operational state to allow the communication performing means 130 to fail to receive the electrical energy from the electric battery in response to the reply signal as to the session-end received from the communication performing means 130 in the step S424.

From the above detailed description, it will be understood that the communication apparatus according to the first preferred embodiment of the present invention makes it easy and convenient for an operator to selectively switch the operational states by the reason that the communication apparatus comprises first information receiving means for receiving the first information from the first external device by performing a passive communication with the first external device, communication performing means for performing an active communication with the second external device, and controlling means for controlling the communication performing means to assume two different operational states including a first operational state to allow the communication performing means to be operable to perform the active communication with the second external device, and a second operational state to allow the communication performing means to be inoperable to perform the active communication with the second external device, the controlling means being adapted to selectively assume the first and second operational states in response to the first information received by the first information receiving means.

The communication apparatus according to the first preferred embodiment of the present invention can save the electrical energy to be generated by the electric battery by the reason that the CPU of the controlling means is adapted to control the switching unit of the controlling means to have the switching unit of the controlling means assume two different operational states including a first operational state to allow the communication performing means to receive the electrical energy from the electric battery, a second operational state to allow the communication performing means to fail to receive the electrical energy from the electric battery, the CPU of the controlling means being adapted to control the switching unit of the controlling means to have the switching unit of the controlling means selectively assume the first and second operational states in response to the first information received by the first information receiving means.

The communication apparatus according to the first preferred embodiment of the present invention can automatically and alternatively assume two different operational states including a first operational state to be operable to perform the active communication with an external device by detecting a specific area in association with the external device, and a second operational state to be inoperable to perform with the external device by detecting the specific area.

The communication apparatus according to the first preferred embodiment of the present invention can automatically and selectively assume a plurality of operational states to be respectively operable to perform the active communication with external devices by distinguishing the external devices.

The communication apparatus according to the first preferred embodiment of the present invention can save the electrical energy to be generated by the electric battery by the reason that the CPU of the controlling means is adapted to measure the elapsed time in response to the first information received by the first information receiving means, and to judge whether or not the elapsed time exceeds the predetermined period of time, the CPU of the controlling means being adapted to control the switching unit of the controlling means to have the switching unit of the controlling means selectively assume the second operational state under the condition that the judgment is made that the elapsed time exceeds the predetermined period of time.

While there has been described in the forgoing first preferred embodiment about the fact that the first information receiving means is adapted to receive the first information from the first external appliance, the first information receiving means may be adapted to detect and judge whether or not the signal level of the radio frequency wave received from the first external device exceeds a predetermined signal level. The controlling means may be adapted to assume the first operational state to allow the communication performing means 130 to be operable to perform the active communication with the second external device 220 by having the communication performing means 130 receive the electrical energy from the electric battery when the judgment is made that the signal level of the radio frequency wave received by the first information receiving means exceeds the predetermined signal level. On the other hand, the controlling means may be adapted to assume the second operational state to allow the communication performing means to be inoperable to perform the active communication with the second external device by having the communication performing means fail to receive the electrical energy from the electric battery when the judgment is made that the signal level of the radio frequency wave received by the first information receiving means exceeds the predetermined signal level.

Second Preferred Embodiment

Although there has been described in the above about the first preferred embodiment of the communication apparatus according to the present invention, this embodiment may be replaced by the second to fifth preferred embodiments of the communication apparatus according to the present invention in order to attain the objects of the present invention. The second to fifth preferred embodiments of the communication apparatus will be described hereinafter.

Figure 6:
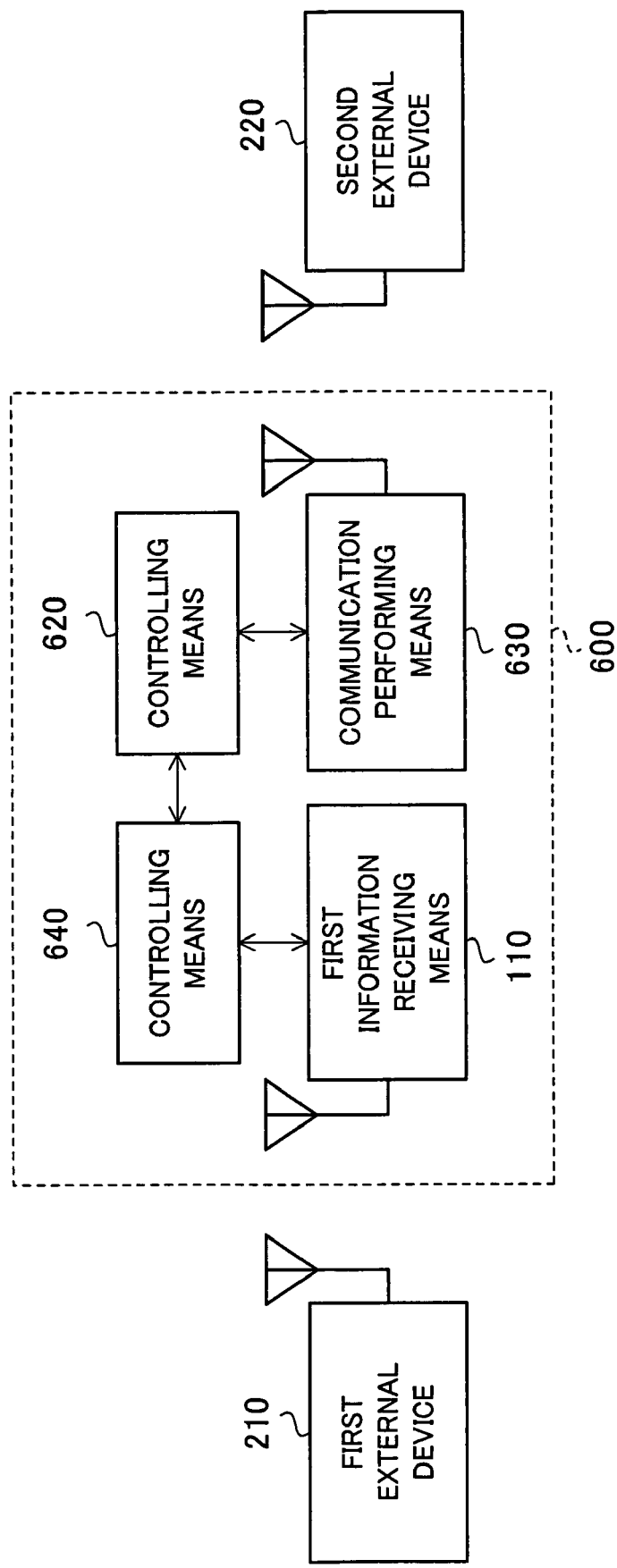
FIG. 6 is a block diagram of the communication apparatus according to the second preferred embodiment of the present invention.
Figure 7:
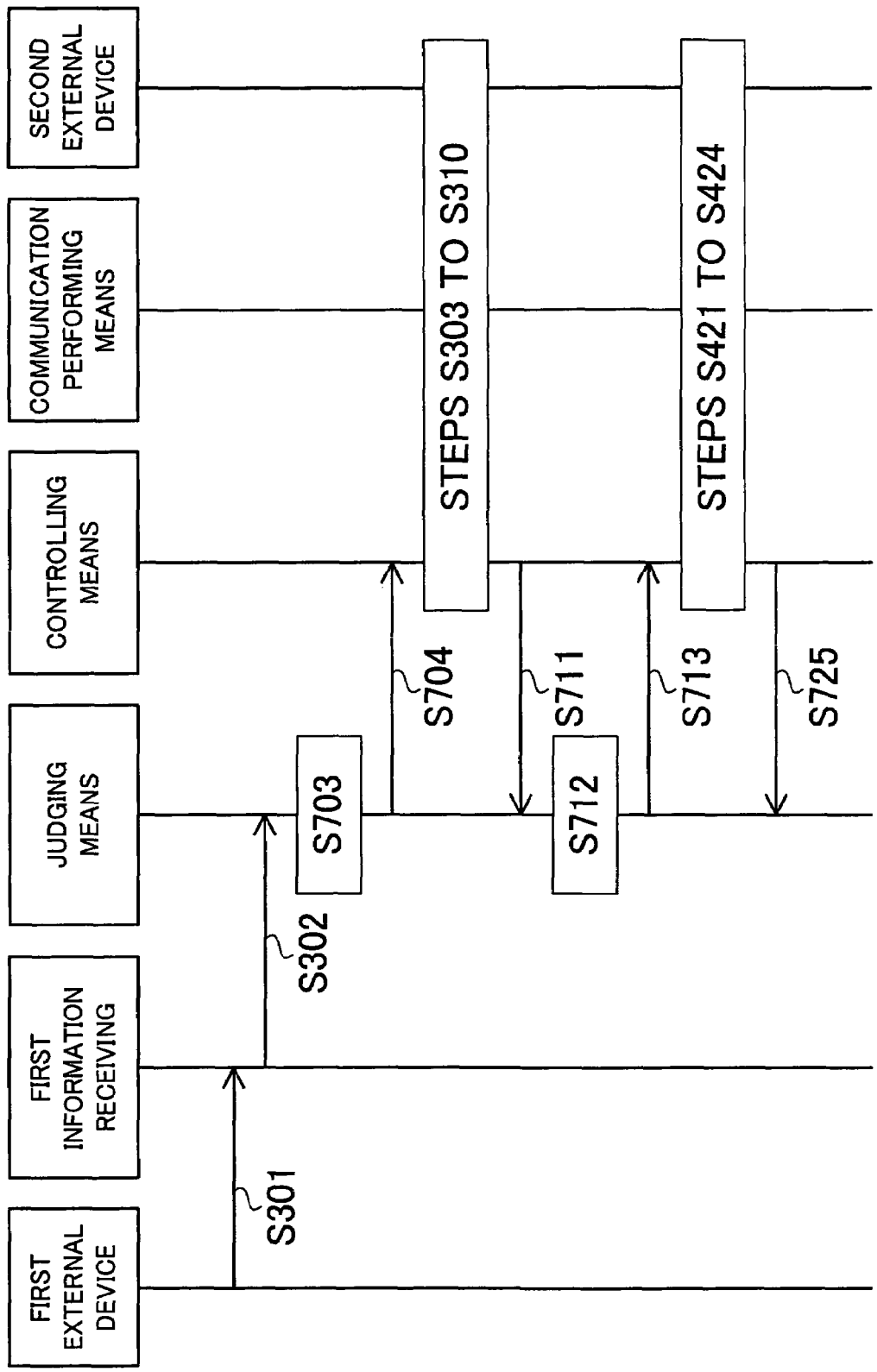
FIG. 7 is a sequence diagram showing a process of the communication apparatus according to the second preferred embodiment of the present invention.

Referring now to FIGS. 6 and 7 of the drawings, there is shown a second preferred embodiment of the communication apparatus according to the present invention.

The constitutional elements and the steps of the second preferred embodiment of the communication apparatus according to the present invention as shown in FIG. 6 is entirely the same as those of the first preferred embodiment of the communication apparatus according to the present invention as shown in FIG. 1 except for the constitutional elements and the steps appearing in the following description. Therefore, only the constitutional elements and the steps of the second preferred embodiment of the communication apparatus different from those of the first preferred embodiment of the communication apparatus will be described in detail hereinafter. The constitutional elements and the steps of the second preferred embodiment of the communication apparatus entirely the same as those of the first preferred embodiment of the communication apparatus will not be described but bear the same reference numerals and legends as those of the first preferred embodiment of the communication apparatus in FIG. 1 to avoid tedious repetition.

The following description will be directed to the constitutional elements and the steps of the second preferred embodiment of the communication apparatus different from those of the first preferred embodiment of the communication apparatus.

As shown in FIG. 6, the communication apparatus 600 is operative in combination with first and second external devices 210 and 220 for respectively producing first and second information.

The communication apparatus 600 comprises first information receiving means 110 for receiving the first information from the first external device 210 under the condition that the passive communication is conducted between the first information receiving means 110 and the first external device 210, communication performing means 130 for performing an active communication with the second external device 220, judging means 640 for judging whether or not to allow the communication performing means 130 to be operable to perform the active communication with the second external device 220, and controlling means 620 for controlling the communication performing means 130 by assuming two different operational states including a first operational state to allow the communication performing means 130 to be operable to perform the active communication with the second external device 220, and a second operational state to allow the communication performing means 130 to be inoperable to perform the active communication with the second external device 220. The controlling means 620 is adapted to selectively assume the first and second operational states in response to the judgment of the judging means 640.

Here, the judging means 640 may be adapted to produce a first operational state setting signal to ensure that the communication performing means 130 is operable to perform the communication with the second external device 220 on the basis of the first information received from the first information receiving means 110. On the other hand, the judging means 640 may be adapted to produce a second operational state setting signal to ensure that the communication performing means 130 is inoperable to perform the communication with the second external device 220 on the basis of the first information received by the first information receiving means 110.

The communication apparatus 600 further comprises an electric battery (not shown) for generating an electrical energy, while the controlling means 620 includes a switching unit 125 having a first terminal 125a to receive the electrical energy from the electric battery, and a second terminal 125b to be operable to receive the electrical energy from the electric battery through the first terminal 125a. The switching unit 125 of the controlling means 620 is adapted to assume two different operational states including a first operational state to allow the communication performing means 130 to receive the electrical energy from the electric battery, and a second operational state to allow the communication performing means 130 to fail to receive the electrical energy from the electric battery.

The controlling means 620 further includes CPU 121 for processing the first information received from the first information receiving means 110 by executing a specific program such as for example an operating software and an application software, ROM 122 stored therein, for example, the operating software to be executed by the CPU 121, RAM 123 have stored therein, for example, the first information received from the first information receiving means 110, and EEPROM 124 having stored therein, for example, the application software to be executed by the CPU 121. The CPU 121 of the controlling means 620 is adapted to control the switching unit 125 to have the switching unit 125 selectively assume the first and second operational states in response to the judgment of the judging means 640.

Here, the communication performing means 130 may be operable to perform the active communication with the second external device 220 by receiving the electrical energy from the electric battery. The judging means 640 may be constituted by the CPU 121. The first information may include the identification code of the application software stored in the EEPROM 124, the start-up parameters of the application software, and the start-up instruction. The CPU 121 of the controlling means 620 may be adapted to execute the application software stored in the EEPROM 124 on the basis of the identification code of the application software, start-up parameters of the application software, and the start-up instruction on the application software received from the first external device 210. The first information receiving means 110 may be adapted to receive data string from the first external device 210 after receiving the first information from the first external device 210, while the communication performing means 130 may be adapted to transmit the data string received by the first information receiving means 110 to the second external device 220.

The judging means 640 may be adapted to adaptively process the data string received by the first information receiving means 110, while the communication performing means 130 may be adapted to transmit the data string adaptively processed by the judging means 640 to the second external device 220. The judging means 640 may be adapted to compute the mean value of the data string received by the first information receiving means 110, while the communication performing means 130 may be adapted to transmit the mean value of the data string computed by the judging means 640 to the second external device 220. The judging means 640 may be adapted to judge whether or not the mean value of the data string is received by the second external device 220 through the communication performing means 130. The judging means 640 may be adapted to produce the de-energized setting signal after the judgment is made that the mean value of the data string is received by the second external device 220 through the communication performing means 130, while the CPU 121 of the controlling means 620 may be adapted to have the switching unit 125 assume the second operational state in response to the second operational state setting signal produced by the judging means 640. The judging means 640 may be adapted to perform the compression of the data string received from the first external device 210 through the first information receiving means 110, while the communication performing means 130 may be adapted to transmit the compressed data string to the second external device 220 by performing the communication with the second external device 220. The CPU 121 of the controlling means 120 may be adapted to produce the information on the data string received from the first external device 110, while the communication performing means 130 may be adapted to transmit the information to the second external device 220.

When the first external device 210 is operated to produce a digital signal indicative of the first information to be transmitted to the first information receiving means 110, the digital signal, generally, is received by the first information receiving means 110 in the form of a predetermined code. The digital signal, however, tends to be partially received by the first information receiving means 110 in another code different from the predetermined code in response to outer noises. This leads to the fact that the digital signal partially received in the form of another code is processed as incorrect information by the CPU 121 of the controlling means 120. The first information receiving means 110 is, therefore, required to be repeatedly operated to receive all of the first information from the first external device 210. Here, the rate of the amount of the digital signal received in the form of another code to the amount of the first information is intended to define as an error rate.

According to the present invention, the judging means 640 may be adapted to calculate the error rate of the data string received by the first information receiving means 110 before judging whether or not the calculated error rate is larger than a predetermined threshold level, while the CPU 121 of the controlling means 620 may be adapted to have the switching unit 125 selectively assume the first and second operational states on the basis of the judgment of the judging means 640.

The operation of the communication apparatus according to the second preferred embodiment of the present invention will be described hereinafter with reference to FIG. 7.

The first information is firstly produced and transmitted to the first information receiving means 110 by the first external device 210. The first information is then received by the first information receiving means 110 under the condition that the passive communication is conducted between the first information receiving means 110 and the first external device 210 in the step S301. The first information is then outputted to the judging means 640 by the first information receiving means 110 in the step S302, while the first information is received and adaptively processed by the judging means 640.

The judgment is made by the judging means 640 whether or not to allow the communication performing means 130 to be operable to perform the active communication with the second external device 220 on the basis of the processed first information in the step S303. When the answer in the step S703 is in the affirmative "YES", the CPU 121 of the controlling means 620 is operated to control the switching unit 125 of the controlling means 620 to have the switching unit 125 of the controlling means 620 assume the first operational state to have the communication performing means 130 receive the electrical energy from the electric battery by allowing the second terminal 125b of the switching unit 125 to receive the electrical energy from the electric battery through the first terminal 125a of the switching unit 125 in response to the judgment of the judging means 640. When, on the other hand, the answer in the step S703 is in the negative "NO", the CPU 121 of the controlling means 620 is operated to control the switching unit 125 of the controlling means 620 to have the switching unit 125 of the controlling means 620 assume the second operational state to have the communication performing means 130 fail to receive the electrical energy from the electric battery by allowing the second terminal 125b of the switching unit 125 to fail to receive the electrical energy from the electric battery through the first terminal 125a of the switching unit 125 in response to the judgment of the judging means 640.

The instruction signal as to the session to be established between the communication performing means 130 and the second external device 220 is then produced and outputted to the communication performing means 130 by the controlling means 620 in the step S305. The session is then established between the communication performing means 130 and the second external device 220 in response to the instruction signal as to the session produced by the controlling means 130 in the step S306. The reply signal as to the session-establishment is then produced and outputted to the controlling means 620 by the communication performing means 130 after the session is established between the communication performing means 130 and the second external device 220 in the step S307.

The instruction signal as to the two-way authentication to be performed between the communication performing means 130 and the second external device 220 is produced and outputted to the communication performing means 130 by the controlling means 620 in response to the reply signal as to the session-establishment received from the communication performing means 130 in the step S308.

The two-way authentication is then performed between the communication performing means 130 and the second external device 220 in response to the instruction signal as to the two-way authentication produce by the controlling means 620 on the basis of the public key cryptosystem. The judgment is made by the communication performing means 130 whether or not to recognized the second external device 220 as a registered device in the step S309.

Here, the two-way authentication may be performed between the communication performing means 130 and the second external device 220 on the basis of the method of one time password authentication.

When the answer in the step S309 is in the affirmative "YES", i.e., the second external device 220 is recognized as the registered device, the controlling means 620 is operated to control the communication performing means 130 to allow the communication performing means 130 to be operable to perform the active communication with the second external device 220 in the step S310. When, on the other hand, the answer in the step S309 is in the negative "NO", i.e., the second external device 220 is not recognized as the registered device, the controlling means 620 is operated to control the communication performing means 130 to allow the communication performing means 130 to be inoperable to perform the active communication with the second external device 220.

The reply signal as to the two-way authentication is finally produced and outputted to the judging means 640 by the controlling means 620 in the step S711, while the reply signal as to the two-way authentication is received from the controlling means 620 by the judging means 640.

From the above detailed description, it will be understood that the communication apparatus according to the first preferred embodiment of the present invention makes it easy and convenient for an operator to selectively switch the operational states by the reason that the communication apparatus comprises first information receiving means for receiving the first information from the first external device under the condition that the passive communication is conducted between the first information receiving means and the first external device, communication performing means for performing an active communication with the second external device, judging means for judging whether or not to allow the communication performing means to be operable to perform the active communication with the second external device, and controlling means for controlling the communication performing means by assuming two different operational states including a first operational state to allow the communication performing means to be operable to perform the active communication with the second external device, and a second operational state to allow the communication performing means to be inoperable to perform the active communication with the second external device, the controlling means being adapted to selectively assume the first and second operational states in response to the judgment of the judging means.

The following description will be directed to the case that the active communication is terminated between the communication performing means 120 and the second external device 220.

The judgment is firstly made by the judging means 640 whether or not to allow the communication performing means 130 to be inoperable to perform the active communication with the second external device 220 in the step 711. When the answer in the step 711 is in the affirmative "YES", the step 711 proceeds to the step 712. When, on the other hand, the answer in the step 711 is in the negative "NO", the step 711 does not proceed to the step 712. The second operational state setting signal is then produced by the judging means 640 on the basis of the judgment of the judging means 640 in the step S712. The second operational state setting signal is then outputted to the controlling means 620, while the second operational state setting signal is received by the controlling means 620 in the step S713.

The instruction signal as to the session-end is then produced and outputted to the communication performing means 130 by the controlling means 120 in response to the de-energize state setting signal produced by the judging means 640 in the step S421. The session is then terminated between the communication performing means 130 and the second external device 220 in response to the instruction signal as to the session-end received from the controlling means 620 in the step S422. The reply signal as to the session-end is then produced and outputted to the controlling means 620 by the communication performing means 130 in the step S423. The CPU 121 of the controlling means 620 is then operated to control the switching unit 125 of the controlling means 620 to have the switching unit 125 of the controlling means 620 assume the second operational state to have the communication performing means 130 fail to receive the electrical energy from the electric battery by allowing the second terminal 125b of the switching unit 125 to fail to receive the electrical energy from the electric battery through the first terminal 125a of the switching unit 125 in response to the reply signal as to the session-end received from the judging means 640 in the step S424.

From the above detailed description, it will be understood that the communication apparatus according to the second preferred embodiment of the present invention can save the electrical energy to be generated by the electric battery by the reason that the CPU of the controlling means is adapted to control the switching unit of the controlling means to have the switching unit of the controlling means assume two different operational states including a first operational state to allow the communication performing means to receive the electrical energy from the electric battery, a second operational state to allow the communication performing means to fail to receive the electrical energy from the electric battery, the CPU of the controlling means being adapted to control the switching unit of the controlling means to have the switching unit of the controlling means selectively assume the first and second operational states in response to the judgment.

The following description will be directed to the case that (1) the identification code of the application software to be executed by the CPU, the start-up parameters of the application software, and the start-up instruction on the application software is received from the first external device 210 by the first information receiving means 110, (2) the judgment is made whether or not to start to execute the application software on the basis of the identification code of the application software, the start-up parameters of the application software, and the start-up instruction on the application software received from the first external device 210 by the first information receiving means 110, (3) the communication performing means 130 is operated to assume the energized state to be operable to perform the communication with the second external device 220 in response to the judgment of the judging means 640.

The first external device 210 is constituted by a teller terminal installed in a bank, the teller terminal having a reading and writing module for producing and transmitting a radio frequency wave indicative of the first information to the first information receiving means 110. The first information receiving means 110 of the communication apparatus 600 is adapted to receive the first information from the reading and writing module of the teller terminal by detecting the radio frequency wave produced by the reading and writing module of the teller terminal.

The first information includes an identification code of application software in association with the services to be provided in the bank through the automatic teller machine, an identification code of the automatic teller machine installed in the bank, start-up parameters of the application software, a start-up instruction on the application software. The application software is previously stored in the EEPROM 124 of the communication apparatus 600.

The second external device 220 is constituted by an automatic teller machine installed in the bank, while the automatic teller machine has a communication module for performing the active communication with the communication performing means 130 of the communication apparatus 600. The controlling means 620 of the communication apparatus 600 is adapted to control the communication performing means 130 of the communication apparatus 600 to assume two different operational states including a first operational state to allow the communication performing means 130 of the communication apparatus 600 to be operable to perform the active communication with the communication module of the automatic teller machine, and a second operational state to allow the communication performing means 130 of the communication apparatus 600 to be inoperable to perform the active communication with the communication module of the automatic teller machine. The judging means 640 of the communication apparatus 600 is adapted to judge whether or not to allow the communication performing means 130 of the communication apparatus 600 to be operable to perform the active communication with the communication module of the automatic teller machine on the basis of the first information received from the first information receiving means 110 of the communication apparatus 600. The controlling means 620 of the communication apparatus 600 is adapted to assume the first and second operational states in response to the judgment of the judging means 640 of the communication apparatus 600. The communication apparatus 600 is built in a mobile phone, while the switching unit 125 having a first terminal 125a to receive the electrical energy from the electric battery built in the mobile phone, and a second terminal 125b to be operable to receive the electrical energy from the electric battery through the first terminal 125a. The CPU 121 of the controlling means 620 is adapted to control the switching unit 125 of the controlling means 620 to have the switching unit 125 of the controlling means 620 assume two different operational states including a first operational state to allow the communication performing means 130 to receive the electrical energy from the electric battery, a second operational state to allow the communication performing means 130 to fail to receive the electrical energy from the electric battery.

Here, the communication performing means 130 may be adapted to perform the active communication with the communication module of the automatic teller machine on the basis of the protocol of the Bluetooth communication. The communication performing means 130 may be adapted to perform the two-way authentication between the communication performing means 130 and the communication module of the automatic teller machine.

In the operation of the communication apparatus 600 according to the second preferred embodiment of the present invention, the first information is firstly received from the reading and writing module of the teller terminal by the first information receiving means 110 of the communication apparatus 600.

The judgment is then made by the judging means 640 whether or not the identification code of the application software, the start-up parameters of the application software, and the start-up instruction on the application software are received from the reading and writing module of the teller terminal. The judgment is then made by the judging means 640 whether or not to start to execute the application software on the basis of the identification code of the application software, the start-up parameters of the application software, and the start-up instruction on the application software received by the first information receiving means 110. The application software is then executed by the CPU 121 of the controlling means 120 on the basis of the judgment of the judging means 640.

The judgment is then made by the judging means 640 whether or not to allow the communication performing means 130 to be operable to perform the active communication with the communication module of the automatic teller machine on the basis of the first information received from the first information receiving means 110. The first operational state setting signal is then produced and outputted to the controlling means 620 by the judging means 640. The controlling means 620 is then operated to control the communication performing means 130 to allow the communication performing means 130 to be operable to perform the active communication with the communication module of the automatic teller machine on the basis of the protocol on Bluetooth communication in response to the judgment of the judging means 640. The CPU 125 of the controlling means 120 is then operated to execute the application software to select a specific service from among the services to be provided in the bank through the automatic teller machine before producing information on the selected service. The communication performing means 130 is operated to transmit the information to the second external device 220 by performing the active communication with the second external device 220. In order to receive the selected service from the automatic teller machine, the communication performing means 130 is then operated to start to perform the active communication with the communication module of the automatic teller machine.

While there has been described in the forgoing second preferred embodiment about the fact that the communication apparatus 600 comprises first information receiving means 110 for receiving the first information from the first external device 210, communication performing means 130 for performing a communication with the second external device 220, judging means 640 for judging whether or not to allow the communication performing means 130 to be operable to perform the communication with the second external device 220 on the basis of the first information received by the first information receiving means 110, and controlling means 620 for controlling the communication performing means 130 by assuming two different operational states including a first operational state to allow the communication performing means 130 to be operable to perform the communication with the second external device 220, and a second operational state to allow the communication performing means 130 to be inoperable to perform the communication with the second external device 220, however, the communication performing means may comprise first information receiving means 110 for receiving the first information from the first external device 210, communication performing means 130 for performing a communication with the second external device 220, the communication performing means 130 including a radio frequency wave producing unit for producing a radio frequency wave to transmit the radio frequency wave to the second external device on the basis of the protocol on Bluetooth communication, and an infrared light beam producing unit for producing an infrared light beam to transmit the infrared light means to the second external device on the basis of the infrared communication standard proposed by the Infrared Data Association, judging means for judging whether to allow the radio frequency wave producing unit to produce and transmit the radio frequency wave to the second external device on the basis of the protocol on Bluetooth communication without allowing the infrared light beam producing unit to produce and transmit the infrared light means to the second external device on the basis of the infrared communication standard proposed by the Infrared Data Association or not to allow the infrared light beam producing unit to produce and transmit the infrared light means to the second external device on the basis of the infrared communication standard proposed by the Infrared Data Association without allowing the radio frequency wave producing unit to produce and transmit the radio frequency wave to the second external device on the basis of the protocol on Bluetooth communication in response to the first information received by the first information receiving means, and controlling means for controlling the first communication performing means by assuming two different operational states including a first operational state to allow the radio frequency wave producing unit to produce and transmit the radio frequency wave to the second external device on the basis of the protocol on Bluetooth communication without allowing the infrared light beam producing unit to produce and transmit the infrared light means to the second external device on the basis of the infrared communication standard proposed by the Infrared Data Association, and a second operational state to allow the infrared light beam producing unit to produce and transmit the infrared light means to the second external device on the basis of the infrared communication standard proposed by the Infrared Data Association without allowing the radio frequency wave producing unit to produce and transmit the radio frequency wave to the second external device on the basis of the protocol on Bluetooth communication in response to the judgment of the judging means.

The following description will be directed to the case that the mobile phone comprises a radio frequency wave producing unit for producing a radio frequency wave to transmit the radio frequency wave to the second external device on the basis of the protocol on Bluetooth communication, and an infrared light beam producing unit for producing an infrared light beam to transmit the infrared light means to the second external device on the basis of the infrared communication standard proposed by the Infrared Data Association.

The first external device is constituted by a teller terminal installed in a bank, the teller terminal having a reading and writing module for producing and transmitting first information to the first information receiving means of the mobile phone while producing and supplying an electrical energy to the first information receiving means of the mobile phone. The first information receiving means of the mobile phone is adapted to receive the first information from the reading and writing module of the teller terminal by performing passive communication with the reading and writing module of the teller terminal in response to the electrical energy supplied by the reading and writing module of the teller terminal. On the other hand, the second external device is constituted by an automatic teller machine installed in the bank, the automatic teller machine having a communication module for performing the active communication with the communication performing means of the mobile phone on the basis of the protocol on Bluetooth communication.

Here, the communication module of the automatic teller machine may be adapted to perform the active communication with the communication performing means of the mobile phone on the basis of one or more communication protocols such as for example the protocol on Bluetooth communication and the protocol of the Infrared data communication.

The judging means may be adapted to selectively produce energized state and second operational state setting signals to the radio frequency wave producing unit by judging whether or not to allow the radio frequency wave producing unit to produce the radio frequency wave on the basis of the protocol on Bluetooth communication without allowing the infrared light beam producing unit to produce the infrared light beam on the basis of the protocol of the Infrared data communication in response to the first information received from the first information receiving means.

In the operation of the mobile phone, the first information is firstly received from the reading and writing module of the teller terminal installed in the bank by the first information receiving means 110 of the mobile phone.

The judgment is then made by the judging means 640 of the mobile phone whether or not the identification code of the application software in association with the bank, the start-up parameters of the application software, and the start-up instruction on the application software are received by the first information receiving means 110. The judgment is then made by the judging means 640 of the mobile phone whether or not to start to execute the application software in association with the bank on the basis of first information received by the first information receiving means 110.

Here, the menu on the services to be provided in the bank may be displayed on the screen of the mobile phone.

The judgment is then made by the judging means 640 of the mobile phone whether or not to allow the communication performing means 130 of the mobile phone to be operable to perform the active communication with the communication module of the automatic teller machine on the basis of the first information received from the first information receiving means 110 of the mobile phone. The first operational state setting signal is then produced and outputted to the controlling means 620 of the mobile phone by the judging means 640 of the mobile phone. The controlling means 620 of the mobile phone is then operated to control the communication performing means 130 of the mobile phone to allow the communication performing means 130 of the mobile phone to be operable to perform the active communication with the communication module of the automatic teller machine on the basis of the protocol on Infrared data communication in response to the judgment of the judging means 640 of the mobile phone. The CPU 125 of the mobile phone is then operated to selectively execute the application software to be stored in the EEPROM by selecting one or more services from among the services to be provided in the bank through the automatic teller machine.

Here, the two-way authentication between the communication performing means 130 and the second external device 220 may be performed by the communication performing means 130 of the mobile phone. The automatic teller machine may be adapted to produce information on the services to be provided in the bank, while the communication performing means 130 of the mobile phone may be adapted to receive the information on the services to be provided in the bank from the communication module of the automatic teller machine. In order to receive the selected service from the automatic teller machine, the communication performing means 130 is then operated to start to perform the active communication with the communication module of the automatic teller machine.

From the above detailed description, it will be understood that the communication apparatus according to the second preferred embodiment of the present invention makes it easy and convenient for an operator to selectively switch the operational states by the reason that the communication apparatus comprises first information receiving means for receiving the first information from the first external device by performing a passive communication with the first external device, communication performing means for performing an active communication with the second external device, and controlling means for controlling the communication performing means to assume two different operational states including a first operational state to allow the communication performing means to be operable to perform the active communication with the second external device, and a second operational state to allow the communication performing means to be inoperable to perform the active communication with the second external device, the controlling means being adapted to selectively assume the first and second operational states in response to the first information received from the first information receiving means.

The communication apparatus according to the second preferred embodiment of the present invention can save the electrical energy to be generated by the electric battery by the reason that the CPU of the controlling means is adapted to control the switching unit of the controlling means to have the switching unit of the controlling means assume two different operational states including a first operational state to allow the communication performing means to receive the electrical energy from the electric battery, a second operational state to allow the communication performing means to fail to receive the electrical energy from the electric battery, the CPU of the controlling means being adapted to control the switching unit of the controlling means to have the switching unit of the controlling means selectively assume the first and second operational states in response to the judgment.

The communication apparatus according to the second preferred embodiment of the present invention can automatically and alternatively assume two different operational states including a first operational state to be operable to perform the active communication with an external device by detecting a specific area in association with the external device, and a second operational state to be inoperable to perform with the external device by detecting the specific area.

The communication apparatus according to the second preferred embodiment of the present invention can automatically and selectively assume a plurality of operational states to be respectively operable to perform the active communication with external devices by distinguishing the external devices.

The communication apparatus according to the second preferred embodiment of the present invention can save the electrical energy to be generated by the electric battery by the reason that the CPU of the controlling means is adapted to measure the elapsed time in response to the first information received from the first information receiving means, and to judge whether or not the elapsed time exceeds the period of time, the CPU of the controlling means being adapted to control the switching unit of the controlling means to have the switching unit of the controlling means selectively assume the second operational state under the condition that the judgment is made that the elapsed time exceeds the predetermined period of time.

Third Preferred Embodiment

Figure 8:
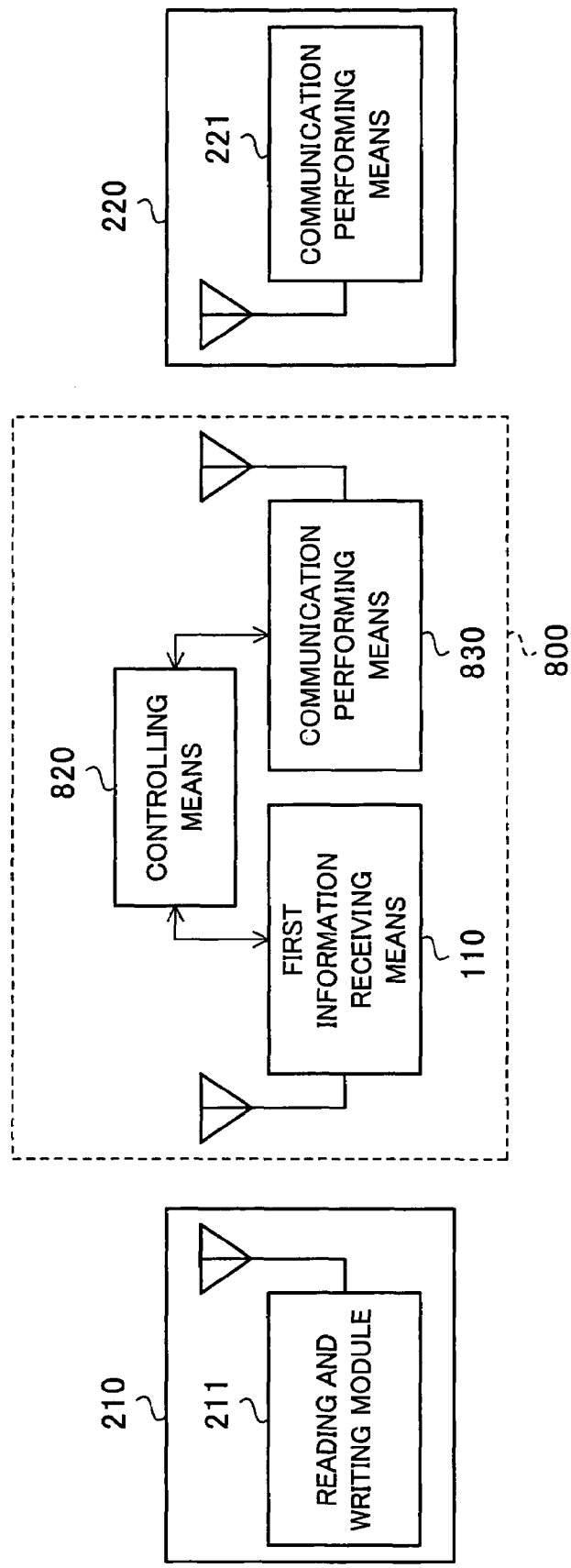
FIG. 8 is a block diagram of the communication apparatus according to the third preferred embodiment of the present invention.
Figure 9:
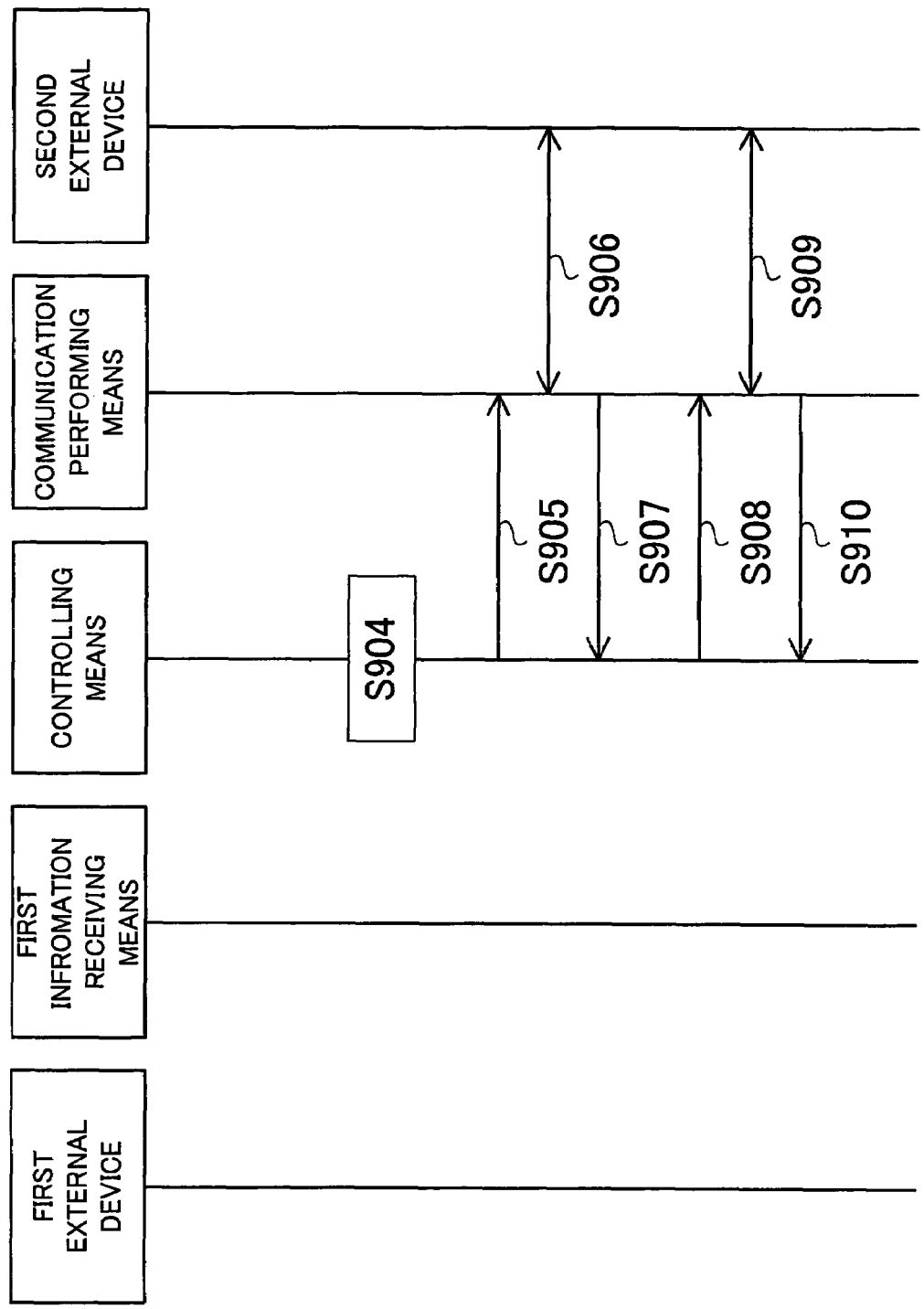
FIG. 9 is a sequence diagram showing a process of the communication apparatus according to the third preferred embodiment of the present invention.

Referring now to FIGS. 8 to 9 of the drawings, there is shown a third preferred embodiment of the communication apparatus according to the present invention.

The constitutional elements and the steps of the third preferred embodiment of the communication apparatus according to the present invention as shown in FIG. 8 is entirely the same as those of the first preferred embodiment of the communication apparatus according to the present invention as shown in FIG. 1 except for the constitutional elements and the steps appearing in the following description. Therefore, only the constitutional elements and the steps of the third preferred embodiment of the communication apparatus different from those of the first preferred embodiment of the communication apparatus will be described in detail hereinafter. The constitutional elements and the steps of the third preferred embodiment of the communication apparatus entirely the same as those of the first preferred embodiment of the communication apparatus will not be described but bear the same reference numerals and legends as those of the first preferred embodiment of the communication apparatus in FIG. 1 to avoid tedious repetition.

The following description will be directed to the constitutional elements and the steps of the third preferred embodiment of the communication apparatus different from those of the first preferred embodiment of the communication apparatus.

The communication apparatus 800 is operative in combination with a first external device 210 for producing first information. The communication apparatus 800 is shown in FIG. 8 as comprising first information receiving means 110 for receiving the first information from the first external device 210 under the condition that the passive communication is conducted between the first information receiving means 110 and the first external device 210, communication performing means 830 for performing an active communication with the second external device 220 on the basis of the protocol on Bluetooth communication, and controlling means 820 for controlling the communication performing means 830 by assuming two different operational states including a first operational state to allow the communication performing means 830 to be operable to perform the active communication with the second external device 220, and a second operational state to allow the communication performing means 830 to be inoperable to perform the active communication with the second external device 220, the controlling means 820 being adapted to selectively assume the first and second operational states in response to the first information received by the first information receiving means 110.

The communication performing means 830 is adapted to perform the active communication with the second external device 220 by forming an ad-hoc communication network such as for example "Piconet". One of the communication performing means 830 and the second external device 220 serves as a master device under the condition that the communication is conducted between the communication performing means 830 and the second external device 220 on the basis of the protocol of the Bluetooth communication, while the other of the communication performing means 830 and the second external device 220 serves as a slave device under the condition that the communication is conducted between the communication performing means 830 and the second external device 220 on the basis of the protocol of the Bluetooth communication. The communication performing means 830 is constituted by a Bluetooth communication module (hereinafter simply referred to as "BT module").

The term "ad-hoc communication network" is intended to indicate a communication network is temporally formed by two or more communication modules located in the vicinity of one another. That network is canceled by those communication modules under the condition that those communication modules moves away from one another.

The following description will be directed to the operation of the communication apparatus 800 according to the third preferred embodiment of the present invention.

The first information is firstly produced and transmitted to the first information receiving means 110 by the first external device 210, while the first information is received by the first information receiving means 110 in the step S301. The first information received by the first information receiving means 110 is then outputted to the controlling means 820 in the step S302. The judgment is made whether or not to allow the BT module 830 to be operable to perform the communication with the second external device 220 in response to the first information received by the controlling means 820 in the step S303.

When the answer in the step S303 is in the affirmative "YES", the step S303 proceeds to the step S904. When, on the other hand, the answer in the step S303 is in the negative "NO", the step S303 does not proceed to the step S904.

The CPU 121 of the controlling means 820 is operated to control the switching unit 125 of the controlling means 820 to have the switching unit 125 of the controlling means 820 assume the first operational state to allow the BT module 830 to receive the electrical energy from the electric battery in the step S904.

The instruction signal as to the session between the BT module 830 and the second external device 220 is then produced and outputted to the BT module 830 by the controlling means 820 in the step S905. The session between the BT module 830 and the second external device 220 is then established by the BT module 830 in response to the instruction signal as to the instruction signal as to the session between the BT module 830 and the second external device 220 received from the controlling means 820 in the step S906. The reply signal as to the session-establishment is then produced and outputted to the controlling means 820 through the BT module 830 by the second external device 220 in the step S907.

The instruction signal as to the two-way authentication between the BT module 830 and the second external device 220 is then produced and outputted to the BT module 830 by the controlling means 820 in the step S908. The two-way authentication between the BT module 830 and the second external device 220 is then performed by the BT module 830 on the basis of the public key cryptosystem.

Here, the two-way authentication between the BT module 830 and the second external device 220 may be performed by the BT module 830 on the basis of the method of one time password authentication.

The judgment is then made by the BT module 830 whether or not to recognized the second external device 220 as a registered device in the step S909. When the answer in the step S909 is in the affirmative "YES", i.e., the second external device 220 is recognized as the registered device, the step S910 proceeds to the step S910. The CPU 121 of the controlling means 820 is operated to control the switching unit 125 of the controlling means 820 to have the switching unit 125 of the controlling means 820 assume the first external state to have the BT module 830 receive the electrical energy from the electric battery to ensure that the BT module 830 is operable to perform the communication with the second external device 220 in the step S910.

When, on the other hand, the answer in the step S909 is in the negative "NO", i.e., the second external device 220 is not recognized as the registered device, the CPU 121 of the controlling means 820 is operated to control the switching unit 125 of the controlling means 820 to have the switching unit 125 of the controlling means 820 assume the second external state to have the BT module 830 fail to receive the electrical energy from the electric battery to ensure that the BT module 830 is inoperable to perform the communication with the second external device 220.

From the above detailed description, it will be understood that the communication apparatus according to the first preferred embodiment of the present invention makes it easy and convenient for an operator to selectively switch the operational states by the reason that the communication apparatus comprises first information receiving means for receiving the first information from the first external device by performing a passive communication with the first external device, communication performing means for performing an active communication with the second external device, and controlling means for controlling the communication performing means to assume two different operational states including a first operational state to allow the communication performing means to be operable to perform the active communication with the second external device, and a second operational state to allow the communication performing means to be inoperable to perform the active communication with the second external device, the controlling means being adapted to selectively assume the first and second operational states in response to the first information received from the first information receiving means.

The communication apparatus according to the first preferred embodiment of the present invention can save the electrical energy to be generated by the electric battery by the reason that the CPU of the controlling means is adapted to control the switching unit of the controlling means to have the switching unit of the controlling means assume two different operational states including a first operational state to allow the communication performing means to receive the electrical energy from the electric battery, a second operational state to allow the communication performing means to fail to receive the electrical energy from the electric battery, the CPU of the controlling means being adapted to control the switching unit of the controlling means to have the switching unit of the controlling means selectively assume the first and second operational states in response to the judgment.

The communication apparatus according to the first preferred embodiment of the present invention can automatically and alternatively assume two different operational states including a first operational state to be operable to perform the active communication with an external device by detecting a specific area in association with the external device, and a second operational state to be inoperable to perform with the external device by detecting the specific area.

The communication apparatus according to the first preferred embodiment of the present invention can automatically and selectively assume a plurality of operational states to be respectively operable to perform the active communication with external devices by distinguishing the external devices.

The communication apparatus according to the first preferred embodiment of the present invention can save the electrical energy to be generated by the electric battery by the reason that the CPU of the controlling means is adapted to measure the elapsed time in response to the first information received from the first information receiving means, and to judge whether or not the elapsed time exceeds the period of time, the CPU of the controlling means being adapted to control the switching unit of the controlling means to have the switching unit of the controlling means selectively assume the second operational state under the condition that the judgment is made that the elapsed time exceeds the predetermined period of time.

While there has been described in the forgoing third preferred embodiment about the fact that the first external device 210 is adapted to produce first information, the first external device 210 may be adapted to produce a first operational state setting signal.

The controlling means 820 may be adapted to control the Bluetooth module 830 to allow the Bluetooth module 830 to be operable to perform the communication with the second external device 220 in response to the first operational state setting signal received from the first external device 210 by the first information receiving means 110.

While there has been described in the forgoing third preferred embodiment about the fact that the first external device 210 is adapted to produce first information, the first external device 210 may be adapted to produce a second operational state setting signal.

From the above detailed description, it will be understood that the communication apparatus according to the third preferred embodiment of the present invention makes it easy and convenient for an operator to selectively switch the operational states by the reason that the communication apparatus comprises first information receiving means for receiving the first information from the first external device by performing a passive communication with the first external device, communication performing means for performing an active communication with the second external device, and controlling means for controlling the communication performing means to assume two different operational states including a first operational state to allow the communication performing means to be operable to perform the active communication with the second external device, and a second operational state to allow the communication performing means to be inoperable to perform the active communication with the second external device, the controlling means being adapted to selectively assume the first and second operational states in response to the first information received from the first information receiving means.

The communication apparatus according to the third preferred embodiment of the present invention can save the electrical energy to be generated by the electric battery by the reason that the CPU of the controlling means is adapted to control the switching unit of the controlling means to have the switching unit of the controlling means assume two different operational states including a first operational state to allow the communication performing means to receive the electrical energy from the electric battery, a second operational state to allow the communication performing means to fail to receive the electrical energy from the electric battery, the CPU of the controlling means being adapted to control the switching unit of the controlling means to have the switching unit of the controlling means selectively assume the first and second operational states in response to the judgment.

The communication apparatus according to the third preferred embodiment of the present invention can automatically and alternatively assume two different operational states including a first operational state to be operable to perform the active communication with an external device by detecting a specific area in association with the external device, and a second operational state to be inoperable to perform with the external device by detecting the specific area.

The communication apparatus according to the third preferred embodiment of the present invention can automatically and selectively assume a plurality of operational states to be respectively operable to perform the active communication with external devices by distinguishing the external devices.

The communication apparatus according to the third preferred embodiment of the present invention can save the electrical energy to be generated by the electric battery by the reason that the CPU of the controlling means is adapted to measure the elapsed time in response to the first information received from the first information receiving means, and to judge whether or not the elapsed time exceeds the period of time, the CPU of the controlling means being adapted to control the switching unit of the controlling means to have the switching unit of the controlling means selectively assume the second operational state under the condition that the judgment is made that the elapsed time exceeds the predetermined period of time.

Fourth Preferred Embodiment

Figure 10:
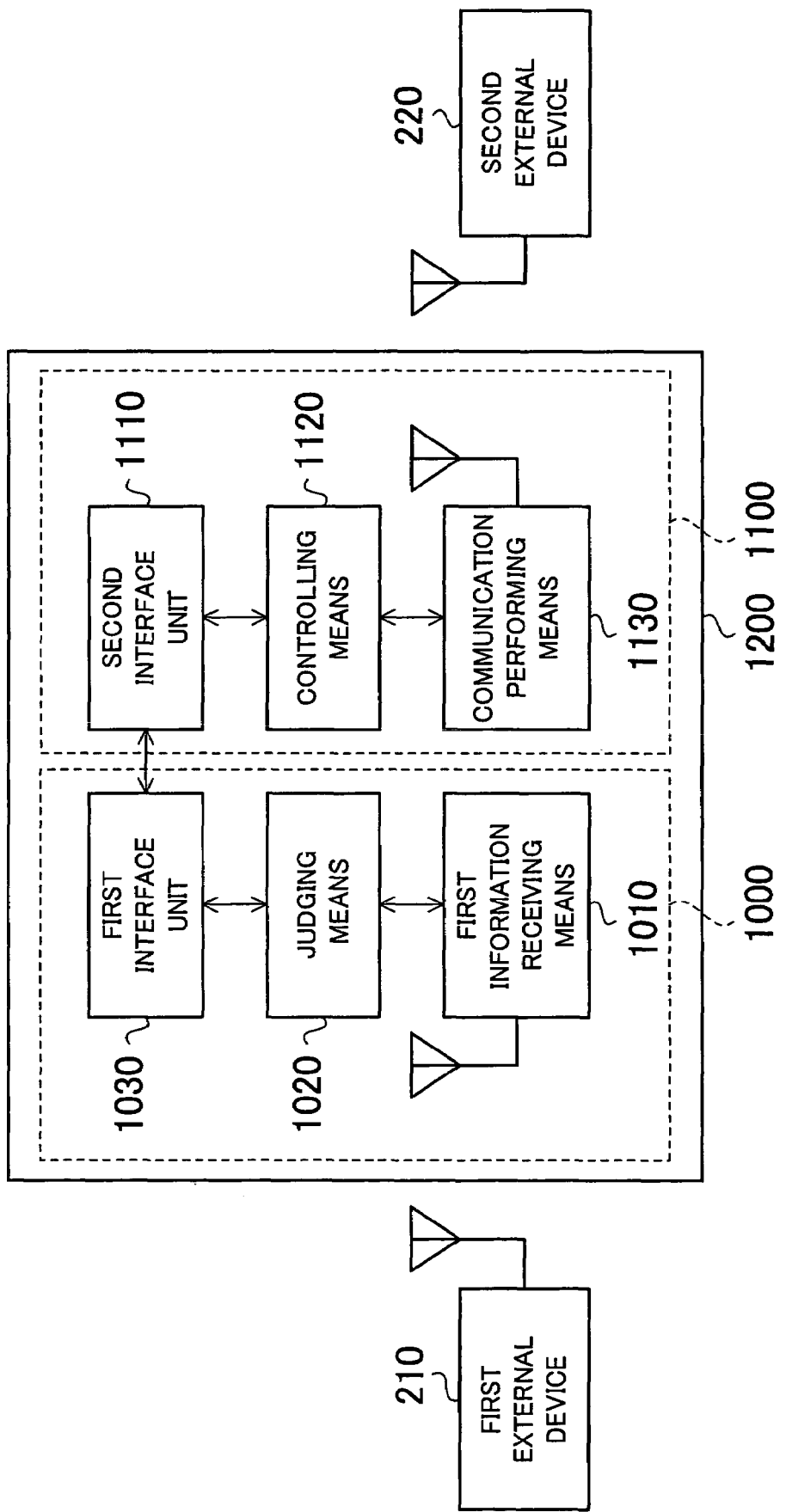
FIG. 10 is a block diagram of the communication apparatus according to the fourth preferred embodiment of the present invention.
Figure 11:
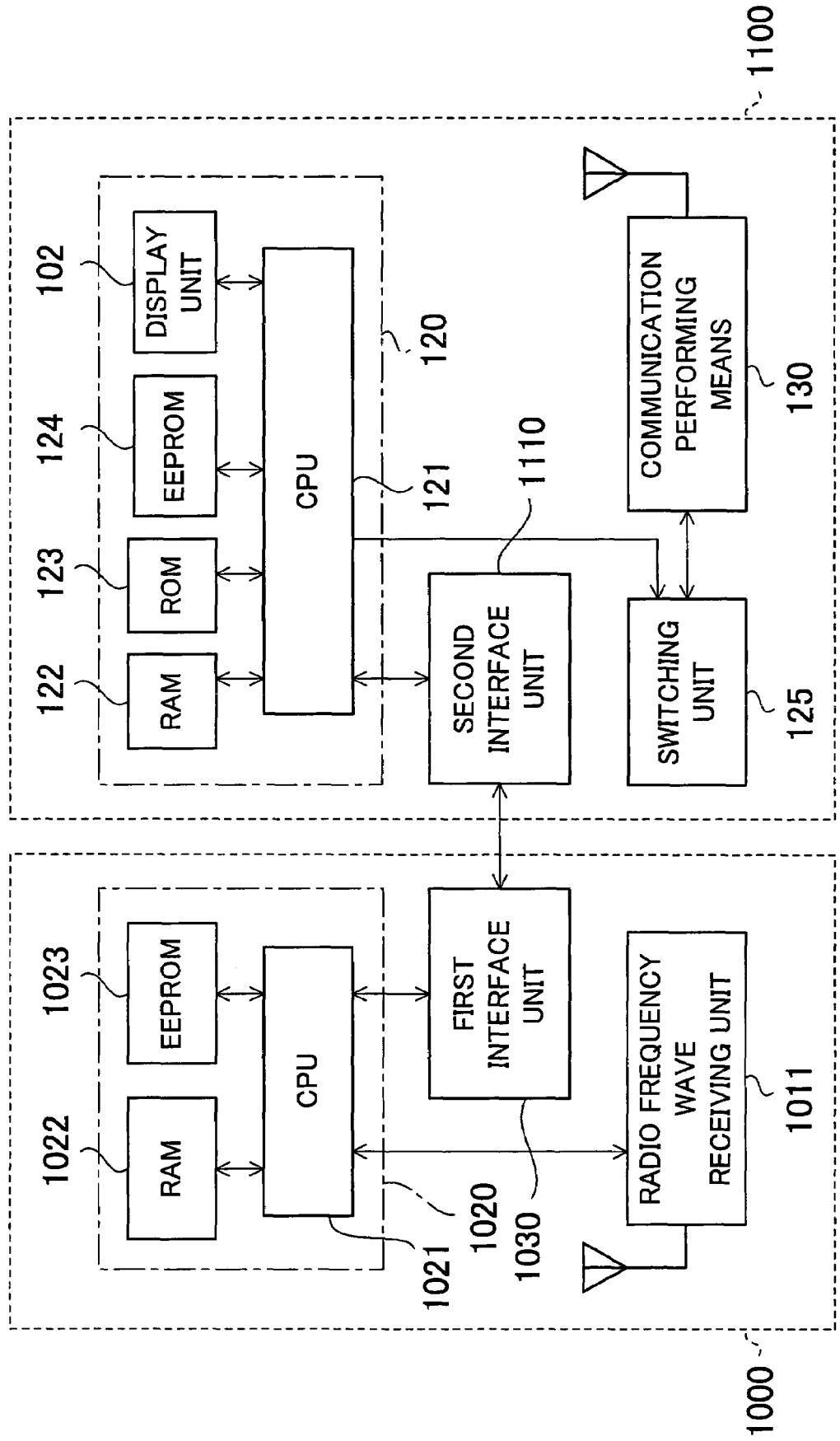
FIG. 11 is a block diagram of the communication apparatus according to the fourth embodiment of the present invention.
Figure 12:
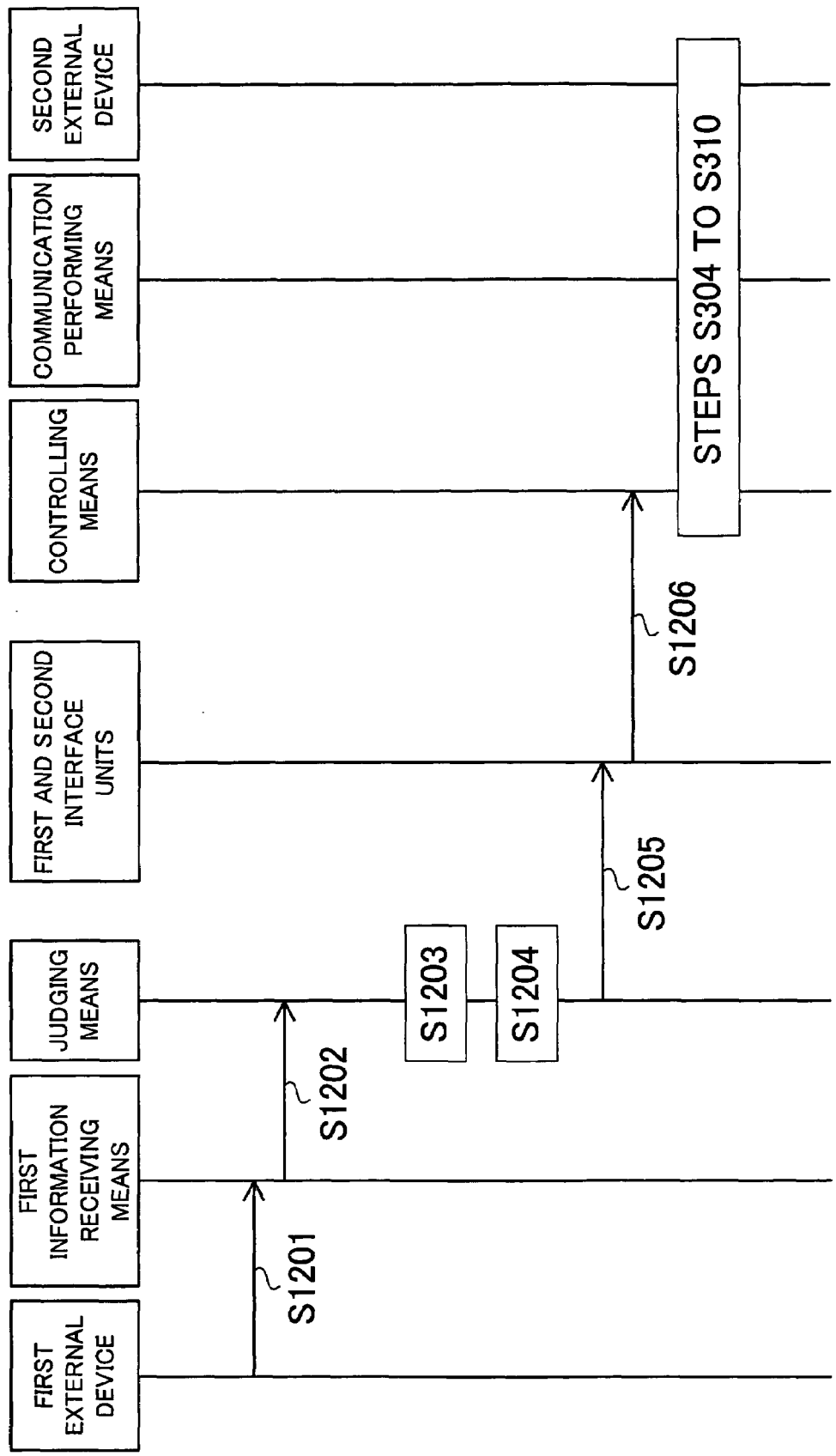
FIG. 12 is a sequence diagram showing a process of the communication apparatus according to the fourth preferred embodiment of the present invention.

Referring now to FIGS. 10 to 12 of the drawings, there is shown a fourth preferred embodiment of the communication apparatus according to the present invention.

The constitutional elements and the steps of the fourth preferred embodiment of the communication apparatus according to the present invention as shown in FIG. 10 is entirely the same as those of the first preferred embodiment of the communication apparatus according to the present invention as shown in FIG. 1 except for the constitutional elements and the steps appearing in the following description. Therefore, only the constitutional elements and the steps of the fourth preferred embodiment of the communication apparatus different from those of the first preferred embodiment of the communication apparatus will be described in detail hereinafter. The constitutional elements and the steps of the fourth preferred embodiment of the communication apparatus entirely the same as those of the first preferred embodiment of the communication apparatus will not be described but bear the same reference numerals and legends as those of the first preferred embodiment of the communication apparatus in FIG. 1 to avoid tedious repetition.

The following description will be directed to the constitutional elements and the steps of the fourth preferred embodiment of the communication apparatus different from those of the first preferred embodiment of the communication apparatus.

The communication apparatus 1200 is operative in combination with first and second external devices 210 and 220 for respectively producing first and second information. The communication apparatus 1200 is shown in FIG. 10 as comprising a housing (not shown), an electric battery (not shown) to be accommodated in the housing to generate an electrical energy, and a communication module 1100 to be accommodated in the housing. The communication module 1100 includes communication performing means 130 for performing active communication with the second external device 220, and controlling means 120 for controlling the communication performing means 130 by assuming two different operational states including a first operational state to allow the communication performing means 130 to be operable to perform the active communication with the second external device 220 by having the communication performing means 130 receive the electrical energy from the electric battery, and a second operational state to allow the communication performing means 130 to be inoperable to perform the active communication with the second external device 220 by having the communication performing means 130 fail to receive the electrical energy from the electric battery.

The communication apparatus 1200 further comprises a communication control module 1000 to be accommodated in the housing. The communication control module 1000 includes first information receiving means 1010 for receiving the first information from the first external device 210, and judging means 1020 for judging whether or not to allow the communication performing means 130 of the communication module 1100 to be operable to perform the active communication with the second external device 220 on the basis of the first information received by the first information receiving means 1010.

The communication control module 1000 further includes a first interface unit 1030 for outputting specific information such as for example the judgment of the judging means 1020 to the communication module 1100, while the communication module 1100 further includes a second interface unit 1110 for receiving the specific information from the first interface unit 1030 of the communication control module 1000. The controlling means 120 of the communication module 1100 is adapted to selectively assume the first and second operational states in response to the information received by the second interface unit 1110.

Here, the first external device 210 may be adapted to produce and transmit a radio frequency wave to the communication control module 1000. The first information receiving means 1010 of the communication control module 1000 may be adapted to perform the passive communication with the first external device 210 by receiving the radio frequency wave from the first external device 210. The judging means 1020 of the communication control module 1000 may be adapted to judge whether or not to allow the communication performing means 130 of the communication module 1100 to be operable to perform the active communication with the second external device 220. The first interface unit 1030 of the communication control module 1000 may be adapted to output the specific information to the communication module 1100 by receiving the electrical energy from the first external device 210. The first information receiving means 1010, the judging means 1020, and the first interface unit 1030 may collectively constitute a contact-free integrated circuit module.

The first external device 210 may be replaced by a reading and writing adapter 211 for performing a communication with the contact-free integrated circuit module. The communication apparatus 1200 may be constituted by a mobile phone including a housing formed with a loading slot, while the contact-free integrated circuit module may be detachably accommodated in the housing of the mobile phone through the loading slot of the housing.

The judging means 1020 of the communication control module 1000 is shown in FIG. 11 as including a rewritable and nonvolatile memory 1023 having stored therein operating software and data, CPU 1021 for executing the software stored in the rewritable and nonvolatile memory 1023 in response to the first information received by the first information receiving means 1010 of the communication control module 1000, and RAM 1022 having stored therein the first information received by the first information receiving means 1010 of the communication control module 1000.

Here, the first information may include a first operational state setting signal. The judging means 1020 of the communication control module 1000 may be adapted to judge whether or not the first information includes the first operational state setting signal when the first information is received by the first information receiving means 1010 of the communication control module 1000. The first interface unit 1030 of the communication control module 1000 may be adapted to output the information on the first operational state setting signal to the communication apparatus 1200, while the controlling means 120 of the communication module 1100 may be adapted to assume the first operational state to allow the communication performing means 130 of the communication module 1100 to be operable to perform the active communication with the second external device 220 by having the communication performing means 130 of the communication module 1100 receive the electrical energy from the electric battery. On the other hand, the first information may include a second operational state setting signal, while the judging means 1020 of the communication control module 1000 may be adapted to judge whether or not the first information includes the second operational state setting signal when the first information is received by the first information receiving means 1010 of the communication control module 1000. The first interface unit 1030 of the communication control module 1000 may be adapted to output the information on the second operational state setting signal to the communication apparatus 1200, while the controlling means 120 of the communication module 1100 may be adapted to assume the second operational state to allow the communication performing means 130 of the communication module 1100 to be inoperable to perform the active communication with the second external device 220 by having the communication performing means 130 of the communication module 1100 fail to receive the electrical energy from the electric battery.

The controlling means 120 of the communication module 1100 includes CPU 121 for executing a specific program such as for example an operating software and an application software, ROM 122 having stored therein, for example, the operating software to be executed by the CPU 121, RAM 123 having stored therein, for example, data to be processed by the CPU 121, EEPROM 124 having stored therein, for example, the application software to be executed by the CPU 121, and a switching unit 125 having a first terminal 125*a* to receive the electrical energy from the electric battery, and a second terminal 125*b* to be operable to have the communication performing means 130 of the communication module 1100 receive the electrical energy from the electric battery through the first terminal 125*a*. The switching unit 125 of the controlling means 120 of the communication module 1100 is adapted to assume two different operational states including a first operational state to have the second terminal 125*b* receive the electrical energy generated by the electric battery through the first terminal 125*a* to ensure that the communication performing means 130 of the communication module 1100 receives the electrical energy from the electric battery, a second operational state to have the second terminal 125*b* fail to receive the electrical energy generated by the electric battery through the first terminal 125*a* to ensure that the communication performing means 130 of the communication module 1100 does not receive the electrical energy from the electric battery.

The CPU 121 of the controlling means 120 of the communication module 1100 is adapted to control the switching unit 125 to have the switching unit 125 selectively assume the first and second operational states in response to the judgment of the judging means 1020.

The following description will be directed to the operation of both the communication module 1100 and the communication control module 1000 each forming part of the communication apparatus 1200 according to the fourth embodiment of the present invention.

As shown in FIG. 12, the first information is firstly produced and transmitted to the first information receiving means 1010 by the first external device 210. On the other hand, the first information is received by the first information receiving means 1010 in the step S1201. The first information received by the first information receiving means 1010 is then outputted to the judging means 1020 in the step S1202.

When the first information is received by the judging means 1020, the judgment is made by the judging means 1020 whether or not to produce a first operational state setting signal to allow the communication performing means 130 to be operable to perform the active communication with the second external device 220 on the basis of the first information received from the first information receiving means 1010 in the step S1203.

When the answer in the step S1203 is in the affirmative "YES", the first operational state setting signal is produced by the judging means 1020 in the step S1204. When, on the other hand, the answer in the step S1203 is in the negative "NO", the second operational state setting signal is produced by the judging means 1020 in the step S1204. The first operational state setting signal is then produced and outputted to the controlling means 120 by the judging means 1020 in the step S1205. The first operational state setting signal is then received by the controlling means 120 through the first interface unit 1030 and the second interface unit 1110 in the step S1206.

The switching unit 125 of the controlling means 120 is then operated to assume the first operational state to have the communication performing means 130 receive the electrical energy generated by the electric battery in response to the first operational state setting signal received by the controlling means 120 in the step S304. The instruction signal as to the session between the communication performing means 130 and the second external device 220 is then produced and outputted to the communication performing means 130 by the controlling means 120 in the step S305. The session between the communication performing means 130 and the second external device 220 is then established by the communication performing means 130 in response to the instruction signal as to the session-establishment received from the controlling means 120 in the step S306. The reply signal as to the session-establishment is then produced and outputted to the communication performing means 130 by the second external device 220 in the step S307.

When the reply signal as to the session-establishment is received by the controlling means 120 through the communication performing means 130, the instruction signal as to the two-way authentication between the communication performing means 130 and the second external device 220 is produced and outputted to the communication performing means 130 by the controlling means 120 in the step S308.

The two-way authentication between the communication performing means 130 and the second external device 220 is then performed by the communication performing means 130 on the basis of the public key cryptosystem.

Here, the two-way authentication between the communication performing means 130 and the second external device 220 may be performed by the communication performing means 130 on the basis of the method of one time password authentication.

When the two-way authentication between the communication performing means 130 and the second external device 220 is performed by the communication performing means 130, the judgment is made by the communication performing means 130 whether or not to recognized the second external device 220 as a registered device in the step S309.

When the answer in the step S309 is in the affirmative "YES", i.e., the second external device 220 is recognized as the registered device, the controlling means 120 is operated to control the communication performing means 130 to allow the communication performing means 130 to be operable to perform the communication with the second external device 220 by having the communication performing means 130 receive the electrical energy from the electric battery in the step S310.

When, on the other hand, the answer in the step S309 is in the negative "NO", i.e., the second external device 220 is not recognized as the registered device, the controlling means 120 is operated to control the communication performing means 130 to allow the communication performing means 130 to be inoperable to perform the communication with the second external device 220 by having the communication performing means 130 fail to receive the electrical energy from the electric battery.

The following description will be directed to the case that the judgment is made by the judging means 1020 whether or not to produce a second operational state setting signal to allow the communication performing means 130 to be inoperable to perform the active communication with the second external device 220 on the basis of the first information received from the first information receiving means 1010 in the step S1203.

The second operational state setting signal is then produced and outputted to the first interface unit 1030 by the judging means 1020. The second operational state setting signal is then received by the controlling means 120 through the first interface unit 1030 and the second interface unit 1110. The switching unit 125 of the controlling means 120 is then operated to assume the second operational state to have the electric battery fail to supply the electrical energy to the communication performing means 130 in response to the second operational state setting signal received by the controlling means 120. This leads to the fact that the communication performing means 130 is inoperable to perform the active communication with the second external device 220.

From the above detailed description, it will be understood that the communication apparatus according to the fourth preferred embodiment of the present invention makes it easy and convenient for an operator to selectively switch the operational states by the reason that the communication apparatus comprises first information receiving means for receiving the first information from the first external device by performing a passive communication with the first external device, communication performing means for performing an active communication with the second external device, and controlling means for controlling the communication performing means to assume two different operational states including a first operational state to allow the communication performing means to be operable to perform the active communication with the second external device, and a second operational state to allow the communication performing means to be inoperable to perform the active communication with the second external device, the controlling means being adapted to selectively assume the first and second operational states in response to the first information received from the first information receiving means.

The communication apparatus according to the fourth preferred embodiment of the present invention can save the electrical energy to be generated by the electric battery by the reason that the CPU of the controlling means is adapted to control the switching unit of the controlling means to have the switching unit of the controlling means assume two different operational states including a first operational state to allow the communication performing means to receive the electrical energy from the electric battery, a second operational state to allow the communication performing means to fail to receive the electrical energy from the electric battery, the CPU of the controlling means being adapted to control the switching unit of the controlling means to have the switching unit of the controlling means selectively assume the first and second operational states in response to the judgment.

The communication apparatus according to the fourth preferred embodiment of the present invention can automatically and alternatively assume two different operational states including a first operational state to be operable to perform the active communication with an external device by detecting a specific area in association with the external device, and a second operational state to be inoperable to perform with the external device by detecting the specific area.

The communication apparatus according to the fourth preferred embodiment of the present invention can automatically and selectively assume a plurality of operational states to be respectively operable to perform the active communication with external devices by distinguishing the external devices.

The communication apparatus according to the fourth preferred embodiment of the present invention can save the electrical energy to be generated by the electric battery by the reason that the CPU of the controlling means is adapted to measure the elapsed time in response to the first information received from the first information receiving means, and to judge whether or not the elapsed time exceeds the period of time, the CPU of the controlling means being adapted to control the switching unit of the controlling means to have the switching unit of the controlling means selectively assume the second operational state under the condition that the judgment is made that the elapsed time exceeds the predetermined period of time.

Fifth Preferred Embodiment

Referring now to FIGS. 13 to 16 of the drawings, there is shown a fifth preferred embodiment of the communication apparatus according to the present invention.

Figure 13:
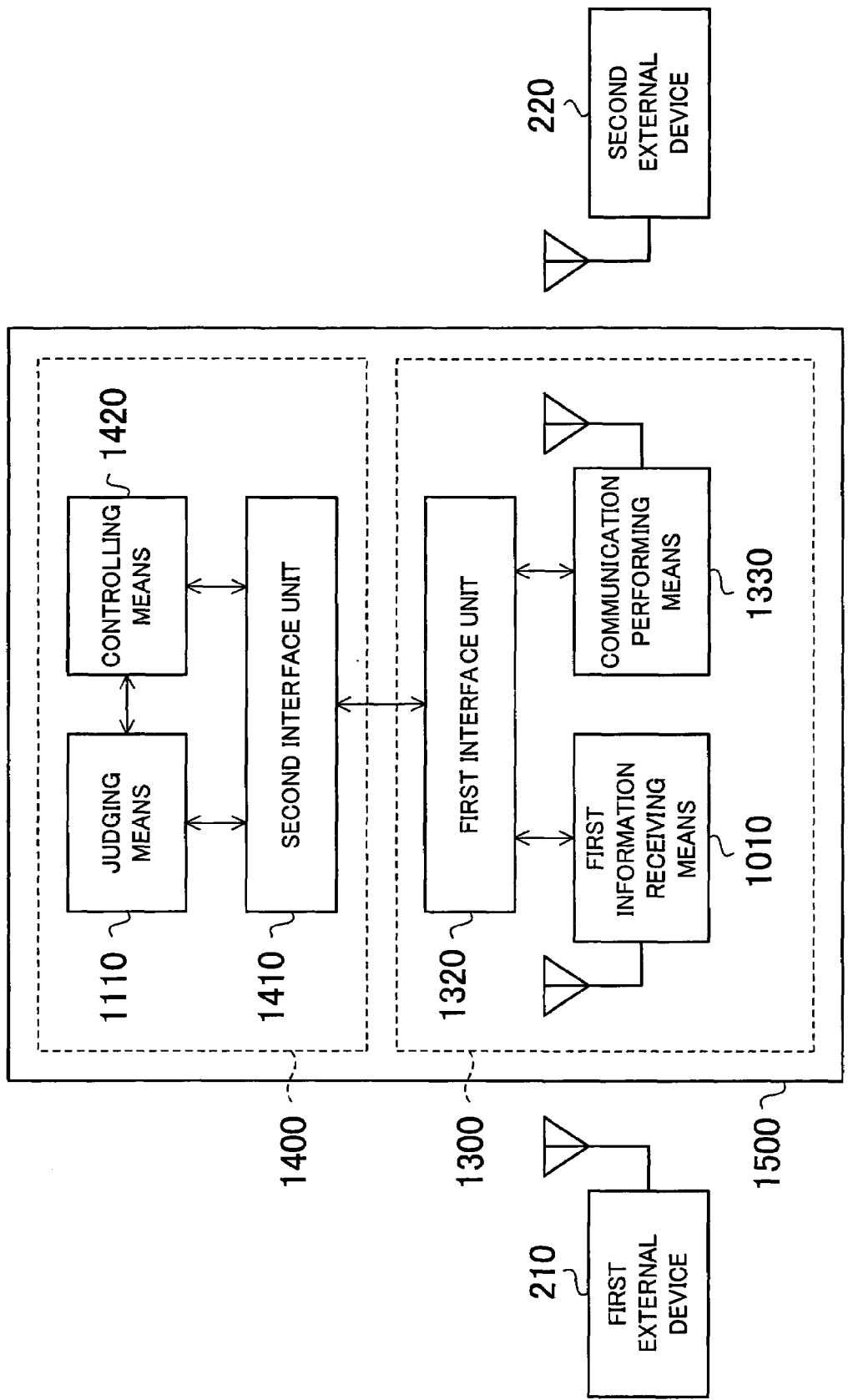
FIG. 13 is a block diagram of the communication apparatus according to the fifth preferred embodiment of the present invention.
Figure 14:
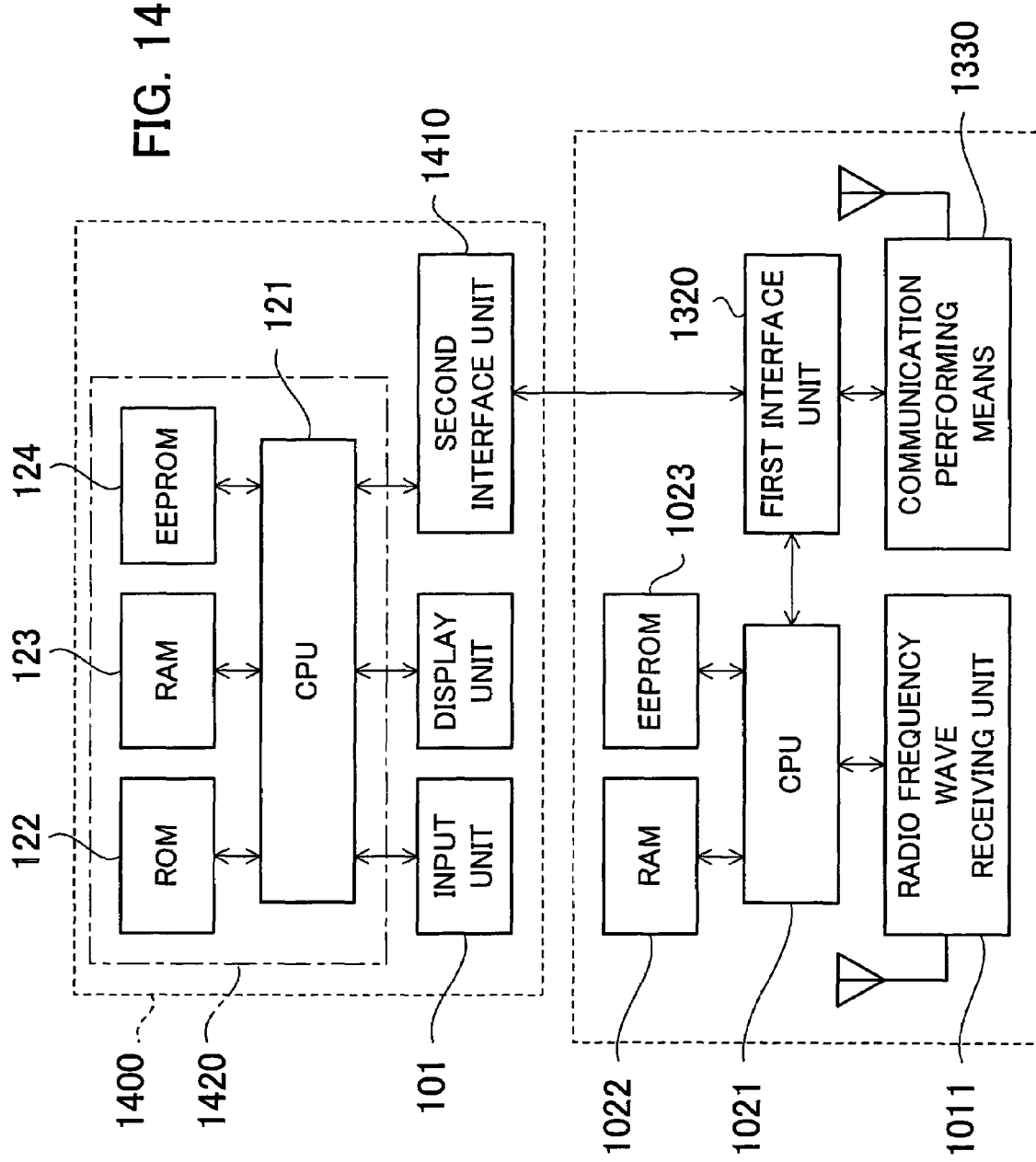
FIG. 14 is a block diagram of the communication apparatus according to the fifth embodiment of the present invention.
Figure 15:
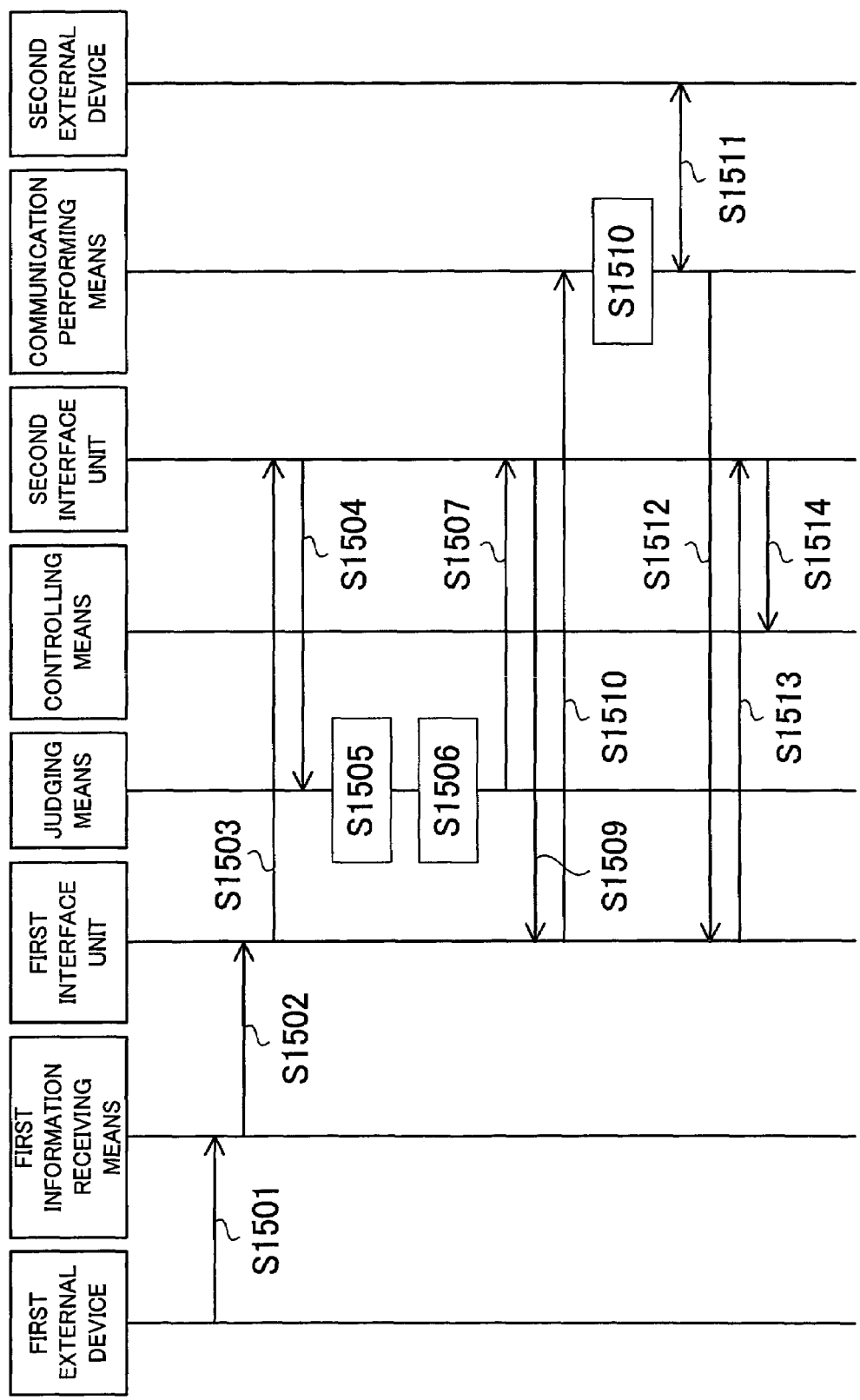
FIG. 15 is a sequence diagram showing a process of the communication apparatus according to the fifth preferred embodiment of the present invention.
Figure 16:
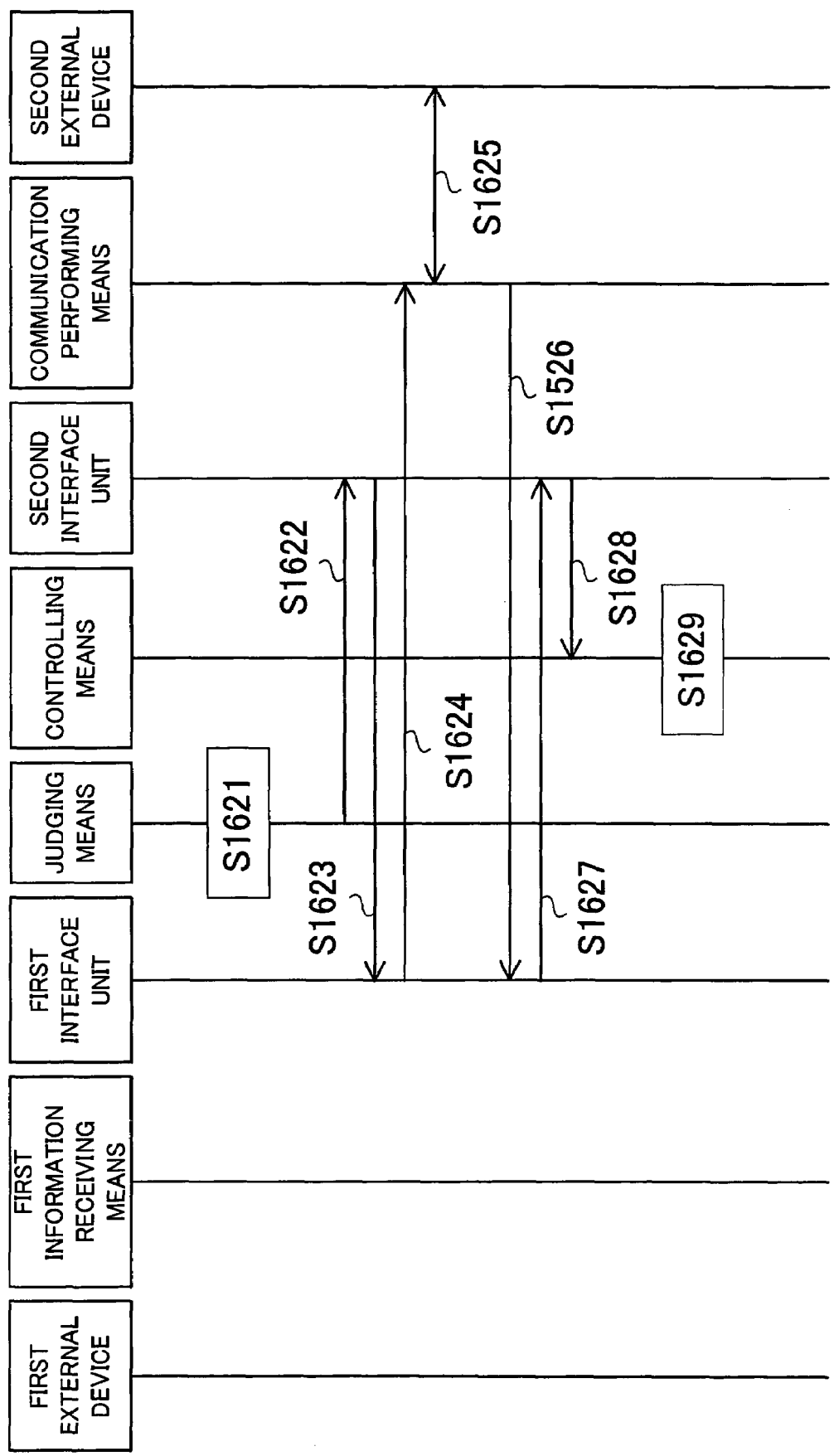
FIG. 16 is a sequence diagram showing a process of the communication apparatus according to the fifth preferred embodiment of the present invention.

The constitutional elements and the steps of the fifth preferred embodiment of the communication apparatus according to the present invention as shown in FIG. 13 is entirely the same as those of the first preferred embodiment of the communication apparatus according to the present invention as shown in FIG. 1 except for the constitutional elements and the steps appearing in the following description. Therefore, only the constitutional elements and the steps of the fifth preferred embodiment of the communication apparatus different from those of the first preferred embodiment of the communication apparatus will be described in detail hereinafter. The constitutional elements and the steps of the fifth preferred embodiment of the communication apparatus entirely the same as those of the first preferred embodiment of the communication apparatus will not be described but bear the same reference numerals and legends as those of the first preferred embodiment of the communication apparatus in FIG. 1 to avoid tedious repetition.

The following description will be directed to the constitutional elements and the steps of the fifth preferred embodiment of the communication apparatus different from those of the first preferred embodiment of the communication apparatus.

The communication apparatus 1500 is operative in combination with first and second external devices 210 and 220 for respectively producing first and second information. The communication apparatus 1500 is shown in FIG. 13 as comprising a housing (not shown), an electric battery (not shown) to be accommodated in the housing to generate an electrical energy, and a communication module 1300 to be accommodated in the housing. The communication module 1300 includes first information receiving means 1010 for receiving the first information from the first external device 210, and communication performing means 1330 for performing active communication with a second external device 220.

The communication apparatus 1500 further comprises a communication control module 1400 to be accommodated in the housing. The communication control module 1400 includes judging means 1420 for judging whether or not to allow the communication performing means 1330 of the communication module 1300 to be operable to perform the active communication with the second external device 220 on the basis of the first information received by the first information receiving means 1010, and controlling means 1421 for controlling the communication performing means 1330 of the communication module 1300 by assuming two different operational states including a first operational state to allow the communication performing means 1330 of the communication module 1300 to be operable to perform the active communication with the second external device 220 by having the communication performing means 1330 of the communication module 1300 receive the electrical energy from the electric battery, and a second operational state to allow the communication performing means 1330 of the communication module 1300 to be inoperable to perform the active communication with the second external device 220 by having the communication performing means 1330 of the communication module 1300 fail to receive the electrical energy from the electric battery.

The controlling means 1421 of the communication control module 1400 is adapted to selectively assume the first and second operational states in response to the judgment of the judging means 1420 of the communication control module 1400.

The communication module 1300 further includes a first interface unit 1320 for outputting the first information received by the first information receiving means 1010 to the communication control module 1400, while the communication control module 1400 further includes a second interface unit 1410 for receiving the first information from the first interface unit 1320 of the communication module 1300.

Here, the first external device 210 may be adapted to produce and output an electrical energy to the communication control module 1400. The first information receiving means 1010 of the communication module 1300 may be adapted to perform the passive communication with the first external device 210 by receiving the electrical energy from the first external device 210. The first interface unit 1320 of the communication module 1300 may be adapted to output the first information received by the first information receiving means 1010 of the communication module 1300 to the second interface unit 1410 of the communication control module 1400 by receiving the electrical energy from the first external device 210. The first information receiving means 1010 of the communication module 1300 may be constituted by a contact-free integrated circuit module. The first external device 210 may be replaced by a reading and writing adapter 211 for performing a communication with the contact-free integrated circuit module. The communication apparatus 1500 may be constituted by a mobile phone including a housing formed with a loading slot, while the contact-free integrated circuit module may be detachably accommodated in the housing of the mobile phone through the loading slot.

The judging means 1420 of the communication control module 1400 is shown in FIG. 11 as including a rewritable and nonvolatile memory 1023 having stored therein operating software and data, CPU 1021 for executing the software stored in the rewritable and nonvolatile memory 1023 in response to the first information received by the second interface unit 1410 of the communication control module 1400, and RAM 1022 having stored therein the first information received by the second interface unit 1410 of the communication control module 1400.

Here, the first information may include a first operational state setting signal. The judging means 1420 of the communication control module 1400 may be adapted to judge whether or not the first information includes the first operational state setting signal when the first information is received by the second interface unit 1410 of the communication control module 1400. The controlling means 1421 of the communication control module 1400 may be adapted to assume the first operational state to allow the communication performing means 1330 of the communication module 1300 to be operable to perform the active communication with the second external device 220 by having the communication performing means 1330 of the communication module 1300 receive the electrical energy from the electric battery when the judgment is made that the first information includes the first operational state setting signal. On the other hand, the first information may include a second operational state setting signal, the judging means 1420 of the communication control module 1400 may be adapted to judge whether or not the first information includes the second operational state setting signal when the first information is received by the second interface unit 1410 of the communication control module 1400. The controlling means 1421 of the communication control module 1400 may be adapted to assume the second operational state to allow the communication performing means 1330 of the communication module 1300 to be operable to perform the active communication with the second external device 220 by having the communication performing means 1330 of the communication module 1300 receive the electrical energy from the electric battery when the judgment is made that the first information includes the first operational state setting signal.

The controlling means 1421 of the communication control module 1400 includes CPU 121 for executing a specific program such as for example an operating software and an application software, ROM 122 having stored therein, for example, the operating software to be executed by the CPU 121, RAM 123 having stored therein, for example, data to be processed by the CPU 121, EEPROM 124 having stored therein, for example, the application software to be executed by the CPU 121, and a switching unit 125 having a first terminal 125*a* to receive the electrical energy from the electric battery, and a second terminal 125*b* to be operable to have the communication performing means 1330 of the communication module 1300 receive the electrical energy from the electric battery through the first terminal 125*a*. The switching unit 125 of the controlling means 1421 of the communication control module 1400 is adapted to assume two different operational states including a first operational state to have the second terminal 125*b* receive the electrical energy generated by the electric battery through the first terminal 125*a* to ensure that the communication performing means 1330 of the communication module 1300 receives the electrical energy from the electric battery, a second operational state to have the second terminal 125*b* fail to receive the electrical energy generated by the electric battery through the first terminal 125*a* to ensure that the communication performing means 1330 of the communication module 1300 does not receive the electrical energy from the electric battery.

The CPU 121 of the controlling means 1421 is adapted to control the switching unit 125 of the controlling means 1421 to have the switching unit 125 of the controlling means 1421 selectively assume the first and second operational states in response to the judgment of the judging means 1420 of the communication control module 1400.

The following description will be directed to the operation of both the communication module 1300 and the communication control module 1400 each forming part of the communication apparatus 1500 according to the fourth embodiment of the present invention.

As shown in FIG. 12, the first information is firstly produced and transmitted to the first information receiving means 1010 by the first external device 210. The first information is received by the first information receiving means 1010 in the step S1201. The first information received by the first information receiving means 1010 is then outputted to the judging means 1420 in the step S1202.

When the first information is received by the judging means 1420, the judgment is made by the judging means 1420 whether or not to produce a first operational state setting signal to ensure that the communication performing means 1330 is operable to perform the active communication with the second external device 220 on the basis of the first information received from the first information receiving means 1010 in the step S1203.

When the answer in the step S1203 is in the affirmative "YES", the first operational state setting signal is produced by the judging means 1420 in the step S1204. When, on the other hand, the answer in the step S1203 is in the negative "NO", the second operational state setting signal is produced by the judging means 1420 in the step S1204.

The first operational state setting signal is then outputted to the first interface unit 1030 by the judging means 1420 in the step S1205. The first operational state setting signal is then received by the controlling means 1421 through the first interface unit 1030 and the second interface unit 1110 in the step S1206.

The switching unit 125 of the controlling means 1421 is then operated to assume the first operational state to have the electric battery supply the electrical energy to the communication performing means 1330 in response to the first operational state setting signal received by the controlling means 1421 to ensure that the communication performing means 1330 is operable to perform the active communication with the second external device 220 in the step S304.

The instruction signal as to the session-establishment is then produced and outputted to the communication performing means 1330 by the controlling means 1421 under the condition that the communication performing means 1330 is operable to perform the communication with the second external device 220 by receiving the electrical energy generated by the electric battery through the switching unit 125 of the controlling means 1421 in the step S305. The session between the communication performing means 1330 and the second external device 220 is then established by the communication performing means 1330 in response to the instruction signal as to the session-establishment received from the controlling means 1421 in the step S306. The reply signal as to the session-establishment is then produced and outputted to the communication performing means 1330 by the second external device 220 in the step S307.

When the reply signal as to the session-establishment is received by the controlling means 1421 through the communication performing means 1330, the instruction signal as to the two-way authentication between the communication performing means 1330 and the second external device 220 is produced and outputted to the communication performing means 1330 by the controlling means 1421 in the step S308.

The two-way authentication between the communication performing means 1330 and the second external device 220 is then performed by the communication performing means 1330 on the basis of the public key cryptosystem.

Here, the two-way authentication between the communication performing means 1330 and the second external device 220 may be performed by the communication performing means 1330 on the basis of the method of one time password authentication.

When the two-way authentication between the communication performing means 1330 and the second external device 220 is performed by the communication performing means 1330, the judgment is made by the communication performing means 1330 whether or not to recognized the second external device 220 as a registered device in the step S309.

When the answer in the step S309 is in the affirmative "YES", i.e., the second external device 220 is recognized as the registered device, the controlling means 1421 is operated to control the communication performing means 1330 to ensure that the communication performing means 1330 is operable to perform the communication with the second external device 220 in the step S310.

When, on the other hand, the answer in the step S309 is in the negative "NO", i.e., the second external device 220 is not recognized as the registered device, the controlling means 1421 is operated to control the communication performing means 1330 to ensure that the communication performing means 1330 is inoperable to perform the communication with the second external device 220.

The following description will be directed to the case that the judgment may be made by the judging means 1420 whether or not to produce a second operational state setting signal to ensure that the communication performing means 1330 is inoperable to perform the active communication with the second external device 220 on the basis of the first information received from the first information receiving means 1010 in the step S1203.

The second operational state setting signal is then produced and outputted to the first interface unit 1030 by the judging means 1420. The second operational state setting signal is then received by the controlling means 1421 through the first interface unit 1030 and the second interface unit 1110. The switching unit 125 of the controlling means 1421 is then operated to assume the second operational state to have the electric battery fail to supply the electrical energy to the communication performing means 1330 in response to the second operational state setting signal received by the controlling means 1421 to ensure that the communication performing means 1330 is inoperable to perform the active communication with the second external device 220.

From the above detailed description, it will be understood that the communication apparatus according to the fifth preferred embodiment of the present invention makes it easy and convenient for an operator to selectively switch the operational states by the reason that the communication apparatus comprises first information receiving means for receiving the first information from the first external device by performing a passive communication with the first external device, communication performing means for performing an active communication with the second external device, and controlling means for controlling the communication performing means to assume two different operational states including a first operational state to allow the communication performing means to be operable to perform the active communication with the second external device, and a second operational state to allow the communication performing means to be inoperable to perform the active communication with the second external device, the controlling means being adapted to selectively assume the first and second operational states in response to the first information received by the first information receiving means.

The communication apparatus according to the fifth preferred embodiment of the present invention can save the electrical energy to be generated by the electric battery by the reason that the CPU of the controlling means is adapted to control the switching unit of the controlling means to have the switching unit of the controlling means assume two different operational states including a first operational state to allow the communication performing means to receive the electrical energy from the electric battery, a second operational state to allow the communication performing means to fail to receive the electrical energy from the electric battery, the CPU of the controlling means being adapted to control the switching unit of the controlling means to have the switching unit of the controlling means selectively assume the first and second operational states in response to the judgment.

The communication apparatus according to the fifth preferred embodiment of the present invention can automatically and alternatively assume two different operational states including a first operational state to be operable to perform the active communication with an external device by detecting a specific area in association with the external device, and a second operational state to be inoperable to perform with the external device by detecting the specific area.

The communication apparatus according to the fifth preferred embodiment of the present invention can automatically and selectively assume a plurality of operational states to be respectively operable to perform the active communication with external devices by distinguishing the external devices.

The communication apparatus according to the fifth preferred embodiment of the present invention can save the electrical energy to be generated by the electric battery by the reason that the CPU of the controlling means is adapted to measure the elapsed time in response to the first information received from the first information receiving means, and to judge whether or not the elapsed time exceeds the period of time, the CPU of the controlling means being adapted to control the switching unit of the controlling means to have the switching unit of the controlling means selectively assume the second operational state under the condition that the judgment is made that the elapsed time exceeds the predetermined period of time.

While the subject invention has been described with relation to the preferred embodiment, various modifications and adaptations thereof will now be apparent to those skilled in the art as far as such modifications and adaptations fall in the scope of the appended claims intended to be covered thereby.

What is claimed is:

1. A communication apparatus to be operative in combination with first and second external devices for respectively producing first and second information, comprising:
    a memory operable to store a plurality of application programs;
    a first information receiving section operable to receive said first information from said first external device wherein said first information includes an identification code identifying an application program from a plurality of application programs stored in the memory;
    a communication performing section operable to perform a communication with said second external device by receiving said second information from said second external device and to produce an exchange information to be transmitted to said second external device;
    a judging section operable to judge whether or not to start to execute the application program on the basis of the identification code of the application program; and
    a controller operable to control said communication performing section by assuming two different operational states including a first operational state to allow said communication performing section to be operable to perform said communication with said second external device, and a second operational state to allow said communication performing section to be inoperable to perform said communication with said second external device, said controller being adapted to selectively assume said first and second operational states in response to said first information received by said first information receiving section, wherein
    said first information is represented by a radio frequency wave to be transmitted to said first information receiving section by said first external device, and
    said first information receiving section is adapted to assume an energized state to receive said first information from said first external device in response to said radio frequency wave received from said first external device.

2. A communication apparatus to be operative in combination with first and second external devices for respectively producing first and second information, comprising:
    a memory operable to store a plurality of application programs;
    a first information receiving section operable to receive said first information from said first external device wherein said first information includes an identification code identifying an application program from a plurality of application programs stored in the memory;
    a communication performing section operable to perform a communication with said second external device by receiving said second information from said second external device and to produce an exchange information to be transmitted to said second external device;
    a judging section operable to judge whether or not to start to execute the application program on the basis of the identification code of the application program; and
    a controller operable to control said communication performing section by assuming two different operational states including a first operational state to allow said communication performing section to be operable to perform said communication with said second external device, and a second operational state to allow said communication performing section to be inoperable to perform said communication with said second external device, said controller being adapted to selectively assume said first and second operational states in response to said first information received by said first information receiving section, wherein said first information is represented by a first operational state setting signal to be transmitted to said first information receiving section by said first external device, said controller is adapted to control said communication performing section to allow said communication performing section to be operable to perform said communication with said second external device in response to said first operational state setting signal received by said first information receiving section, said controller includes an elapsed time measuring unit for measuring an elapsed time in response to said first operational state setting signal received by said first information receiving section before judging whether or not said elapsed time exceeds a predetermined period of time, and said controller is adapted to assume said second operational state when the judgment is made that said elapsed time exceeds a predetermined period of time.

3. A communication apparatus to be operative in combination with first and second external devices for respectively producing first and second information, comprising:

a housing;

a communication module to be accommodated in said housing, said communication module including a communication performing section for performing a communication with said second external device by receiving said second information from said second external device and producing an exchange information to be transmitted to said second external device, and a controller for controlling said communication performing section by assuming two different operational states including a first operational state to allow said communication performing section to be operable to perform said communication with said second external device, and a second operational state to allow said communication performing section to be inoperable to perform said communication with said second external device; and a communication control module to be accommodated in said housing, said communication control module including a first information receiving section for receiving said first information from said first external device wherein said first information includes an identification code for any of a plurality of application programs stored in memory means, and a judging section for judging whether or not to allow said communication performing section of said communication module to be operable to perform said communication with said second external device on the basis of said first information received by said first information receiving section and whether or not to start to execute a particular application program on the basis of the identification code, wherein said controller of said communication module is adapted to selectively assume said first and second operational states in response to the judgment of said judging section of said communication control module, wherein said first information is represented by a radio frequency wave to be transmitted to said first information receiving section of said communication control module by said first external device, and said first information receiving section of said communication control module is adapted to assume an energized state to receive said first information from said first external device in response to said radio frequency wave received from said first external device.

4. A communication apparatus to be operative in combination with first and second external devices for respectively producing first and second information, comprising:

a housing;

a communication module to be accommodated in said housing, said communication module including a communication performing section for performing a communication with said second external device by receiving said second information from said second external device and producing an exchange information to be transmitted to said second external device, and a controller for controlling said communication performing section by assuming two different operational states including a first operational state to allow said communication performing section to be operable to perform said communication with said second external device, and a second operational state to allow said communication performing section to be inoperable to perform said communication with said second external device; and a communication control module to be accommodated in said housing, said communication control module including a first information receiving section for receiving said first information from said first external device wherein said first information includes an identification code for any of a plurality of application programs stored in memory means, and a judging section for judging whether or not to allow said communication performing section of said communication module to be operable to perform said communication with said second external device on the basis of said first information received by said first information receiving section and whether or not to start to execute a particular application program on the basis of the identification code, wherein said controller of said communication module is adapted to selectively assume said first and second operational states in response to the judgment of said judging section of said communication control module, wherein said controller of said communication module includes an elapsed time measuring unit for measuring an elapsed time in response to said first operational state setting signal received by said first information receiving section of said communication control module before judging whether or not said elapsed time exceeds a predetermined period of time, and said controller of said communication module is adapted to assume said second operational state when the judgment is made that said elapsed time exceeds a predetermined period of time.

5. A communication apparatus to be operative in combination with first and second external devices for respectively producing first and second information, comprising:

a housing;

a communication module to be accommodated in said housing, said communication module including a communication performing section for performing a communication with said second external device by receiving said second information from said second external device and producing an exchange information to be transmitted to said second external device, and a controller for controlling said communication performing section by assuming two different operational states including a first operational state to allow said communication performing section to be operable to perform said communication with said second external device, and a second operational state to allow said communication performing section to be inoperable to perform said communication with said second external device; and a communication control module to be accommodated in said housing, said communication control module including a first information receiving section for receiving said first information from said first external device wherein said first information includes an identification code for any of a plurality of application programs stored in memory means, and a judging section for judging whether or not to allow said communication performing section of said communication module to be operable to perform said communication with said second external device on the basis of said first information received by said first information receiving section and whether or not to start to execute a particular application program on the basis of the identification code, wherein said controller of said communication module is adapted to selectively assume said first and second operational states in response to the judgment of said judging section of said communication control module, wherein said communication apparatus further comprises an electric battery accommodated in said housing to produce an electrical energy, and in which said controller of said communication module includes a switching unit to be electrically connected to said electric battery, said switching unit being adapted to assume two different operational states including a first operational state to have said communication performing section of said communication module receive said electrical energy produced by said electric battery to ensure that said communication performing section of said communication module is operable to perform said communication with said second external device, and a second operational state to have said communication performing section of said communication module fail to receive said electrical energy produced by said electric battery to ensure that said communication performing section of said communication module is inoperable to perform said communication with said second external device.

6. A communication apparatus to be operative in combination with first and second external devices for respectively producing first and second information, comprising:

a housing;

a communication module to be accommodated in said housing, said communication module including first information receiving section operable to receive said first information from said first external device, communication performing section operable to perform a communication with said second external device by receiving said second information from said second external device and producing an exchange information to be transmitted to said second external device, and controller operable to control said communication performing section by assuming two different operational states including a first operational state to allow said communication performing section to be operable to perform said communication with said second external device, and a second operational state to allow said communication performing section to be inoperable to perform said communication with said second external device; and a communication control module to be accommodated in said housing, said communication control module including judging means for judging whether or not to allow said communication performing section of said communication module to be operable to perform said communication with said second external device on the basis of said first information received by said first information receiving section of said communication module, wherein said controller of said communication module is adapted to selectively assume said first and second operational states in response to the judgment of said judging means of said communication control module, wherein said first information is represented by a radio frequency wave to be transmitted to said first information receiving section of said communication module by said first external device, and said first information receiving section of said communication control module is adapted to assume an energized state to receive said first information from said first external device in response to said radio frequency wave received from said first external device.

7. A communication apparatus to be operative in combination with first and second external devices for respectively producing first and second information, comprising:

a housing;

a communication module to be accommodated in said housing, said communication module including first information receiving section operable to receive said first information from said first external device, communication performing section operable to perform a communication with said second external device by receiving said second information from said second external device and producing an exchange information to be transmitted to said second external device, and controller operable to control said communication performing section by assuming two different operational states including a first operational state to allow said communication performing section to be operable to perform said communication with said second external device, and a second operational state to allow said communication performing section to be inoperable to perform said communication with said second external device; and a communication control module to be accommodated in said housing, said communication control module including judging means for judging whether or not to allow said communication performing section of said communication module to be operable to perform said communication with said second external device on the basis of said first information received by said first information receiving section of said communication module, wherein said controller of said communication module is adapted to selectively assume said first and second operational states in response to the judgment of said judging means of said communication control module, wherein said communication apparatus further comprises an electric battery accommodated in said housing to produce an electrical energy, and said controller of said communication module includes a switching unit having inputted therein said electrical energy produced by said electric battery, said switching unit being adapted to assume two different operational states including a first operational state to have said communication performing section of said communication module receive said electrical energy produced by said electric battery to ensure that said communication performing section of said communication module is operable to perform said communication with said second external device, and a second operational state to have said communication performing section of said communication module fail to receive said electrical energy produced by said electric battery to ensure that said communication performing section of said communication module is inoperable to perform said communication with said second external device.

8. A communication module to be operative in combination with a communication control module including a first information receiving section for receiving first information from a first external device wherein said first information includes an identification code for any of a plurality of application programs stored in memory means, a judging section for judging whether or not to allow a communication performing section of a communication module to be operable to perform said communication with a second external device on the basis of said first information received by said first information receiving section when said first information receiving section receives said first information from said first external device, comprising:

a communication performing section for performing a communication with said second external device by receiving said second information from said second external device and producing an exchange information to be transmitted to said second external device; and a controller for controlling said communication performing section by assuming two different operational states including a first operational state to allow said communication performing section to be operable to perform said communication with said second external device, and a second operational state to allow said communication performing section to be inoperable to perform said communication with said second external device, wherein said controller of said communication module is adapted to assume said first operational state to allow said communication performing section to be operable to perform said communication with said second external device and whether or not to start to execute a particular application program on the basis of the identification code in response to the judgment of said judging section of said communication control module, said first information is represented by a first operational state setting signal to be transmitted to said first information receiving section of said communication control module by said first external device, said controller is adapted to control said communication performing section to allow said communication performing section to be operable to perform said communication with said second external device in response to said first operational state setting signal received by said first information receiving section of said communication control module, said controller includes an elapsed time measuring unit for measuring an elapsed time in response to said first operational state setting signal received by said first information receiving section of said communication control module before judging whether or not said elapsed time exceeds a predetermined period of time, and said controller is adapted to assume said second operational state when the judgment is made that said elapsed time exceeds a predetermined period of time.

9. A communication control module to be operative in combination with a communication module including a communication performing section for performing a communication with a second external device by receiving said second information from said second external device and producing an exchange information to be transmitted to said second external device, and a controller for controlling said communication performing section by assuming two different operational states including a first operational state to allow said communication performing section to be operable to perform said communication with said second external device, and a second operational state to allow said communication performing section to be inoperable to perform said communication with said second external device, comprising:

a first information receiving section for receiving said first information from said first external device wherein said first information includes an identification code for any of a plurality of application programs stored in memory means; and a judging section for judging whether or not to allow said communication performing section of said communication module to be operable to perform said communication with said second external device on the basis of first information received by said first information receiving section and whether or not to start to execute a particular application program on the basis of the identification code when said first information receiving section receives said first information from said first external device, wherein said controller of said communication module is adapted to assume said first operational state to allow said communication performing section to be operable to perform said communication with said second external device in response to the judgment of said judging section of said communication control module, wherein said first information is represented by a radio frequency wave to be transmitted to said first information receiving section by said first external device, and said first information receiving section is adapted to assume an energized state to receive said first information from said first external device in response to said radio frequency wave received from said first external device.

10. A communication module, comprising:

a first information receiving section for receiving first information from a first external device wherein said first information includes an identification code for any of a plurality of application programs stored in memory means, a communication performing section for performing a communication with a second external device by receiving said second information from said second external device and producing an exchange information to be transmitted to said second external device;

a judging section for judging whether or not to start to execute a particular application program on the basis of the identification code; and a controller for controlling said communication performing section by assuming two different operational states including a first operational state to allow said communication performing section to be operable to perform said communication with said second external device, and a second operational state to allow said communication performing section to be inoperable to perform said communication with said second external device, wherein said controller of said communication module is adapted to selectively assume said first and second operational states in response to the judgment of said judging section of said communication control module, wherein said controller of said communication module includes an elapsed time measuring unit for measuring an elapsed time in response to said first operational state setting signal received by said first information receiving section of said communication module, and an elapsed time judging unit for judging whether or not said elapsed time exceeds a predetermined period of time, and said controller of said communication module is adapted to assume said second operational state when the judgment is made that said elapsed time exceeds a predetermined period of time.

* * * * *